United States Patent [19]

Rossides

[11] Patent Number: 5,276,435
[45] Date of Patent: Jan. 4, 1994

[54] LABELLING SYSTEM FOR DETERRING THE THEFT OF A VERY WIDE VARIETY OF ITEMS

[76] Inventor: Michael T. Rossides, 3666 Upton St., NW., Washington, D.C. 20008

[21] Appl. No.: 547,247

[22] Filed: Jul. 3, 1990

[51] Int. Cl.⁵ .................. G08B 3/00; E05B 65/00; B12D 15/00
[52] U.S. Cl. .......................... 340/691; 40/5; 70/57; 116/307; 235/382; 283/72; 340/571; 340/825.32
[58] Field of Search ........ 340/691–693, 542, 426, 568, 571–572, 825.31–835.34, 825.36, 825.56; 40/1.6, 5, 27.5, 201, 448, 630–634, 655, 910, 319; 70/50, 57–76, 277, 432–441; 116/33, 307; 235/23, 27, 379–382.5; 283/72–74, 98–114, 904; 902/26

[56] References Cited

U.S. PATENT DOCUMENTS

| | | | |
|---|---|---|---|
| 1,249,798 | 12/1917 | McNally, Jr. | 40/201 |
| 1,392,869 | 10/1921 | Downey | 116/33 X |
| 1,636,513 | 7/1927 | Hughes | 40/631 |
| 3,583,317 | 6/1971 | Gibson | 283/98 |
| 3,769,725 | 11/1973 | Stewart, Jr. | 40/643 |
| 4,262,284 | 4/1981 | Stieff et al. | 340/568 |
| 4,596,203 | 6/1986 | Lorek | 340/542 X |
| 4,743,894 | 5/1988 | Bochmann | 340/691 |
| 4,768,027 | 8/1988 | Benjamin et al. | 340/691 |
| 4,879,455 | 11/1989 | Butterworth et al. | 235/380 |

*Primary Examiner*—Jin F. Ng
*Assistant Examiner*—Thomas J. Mullen, Jr.

[57] ABSTRACT

A labelling system which can protect a very wide variety of items from theft. The system requires four elements in combination: 1) A readily understandable message on an item which describes the state the owner intends the item to be in and further asks observers to take appropriate action should the item not be in that state. 2) The message must be easily detectable by people nearby. 3) The message must be changeable, at least once, to reflect a change in the state of the item it is on but, it must only be changeable by the owner and anyone he or she chooses. 4) The message must be very difficult to tamper with or hide without leaving a trace.

14 Claims, 29 Drawing Sheets

This item is protected by an ID4.
If the ID4 is missing,
please report this item as stolen.
Call the police or
1-800-T-H-E-F-T-S-T-O-P.
Reward offered for information
leading to the conviction of
anyone connected with the
theft of this item.
24960

Figure 3

$$\frac{ID4}{24960}$$

Figure 4

Praise for HAMLET

*Fie but my grief was real. May Shakespeare ne'er die that he may e'er kill us with sorrow. Another masterful tragedy!*
                    Francis Bacon

*Reading HAMLET is better than seeing it. You feel the monarch's woe as if it is your own. The pain, oh the pain.*
                    Queen Elizabeth

*If you read one play, let it be HAMLET.*
                    C. Marlowe

SIGNET BOOKS

This book is stolen if it has no duplicate of the stamp below. If stolen, please return it to us. $250 reward for information leading to conviction of anyone involved in the theft of this book.

BOB'S BOOKS 202-966-3452

SHARP ID4
24960

This Fax Machine:

Belongs To: Fax Rental Co.

Is Rented To: Bob's Books

Belongs At: 4529 Jake St.

Is Due Back By: June 14, 1990

If this machine is not in the state described above, call the police or Fax Rental Co. at 202-563-9124

Figure 17

**SHARP ID4
24960**

This Fax Machine:

Belongs To: Fax Rental Co.

Is Rented To: Jack Kerouac

Belongs At: 413 5th Avenue

Is Due Back By: May 30, 1990

If this machine is not in the state described above, call the police or Fax Rental Co. at 202-563-9124

Figure 18

LABELLING SYSTEM FOR DETERRING THE THEFT OF A VERY WIDE VARIETY OF ITEMS

BACKGROUND—DESCRIPTION OF PRIOR ART

From time immemorial, people have tried to prevent theft. They have devised all manner of means to physically stop it including locks, safes, fences, bars, cut-off mechanisms and computer passwords. And they have come up with many systems that identify things as stolen or being stolen. Such "theft identifying systems" can be divided into five types:

1) Permanent Markings

An example is "GOVERNMENT PROPERTY" on a pen signifying that the pen may be stolen if it is outside a government building. The flaw of permanent markings is they can't be changed to reflect a change in the marked item.

2) Seals

Seals reveal whether a thing has been tampered with. They can stop tampering in certain cases but are unsuitable for safeguarding most things.

3) Alarms

Thousands of alarms have been invented not all using sound to inform. The thing that distinguishes alarms is that they require a tripping mechanism to set them off. These mechanisms can often be disarmed and usually add significant costs. Also, alarms are not usually suitable for protecting individual items.

4) Special Inspection Methods

An example is the putting of magnetic strips inside books. If not demagnetized, these strips sound an alarm at special detectors at the exits of bookstores. Another example is the stationing of an inspector at the exit of Baggage Handling in an airport to make sure luggage isn't stolen. Special inspection methods are usually costly and often impractical.

5) Lockable Labels

Certain theft identifying inventions are labels which can be changed but only by the owners of the items the labels are on. These labels might be called "lockable labels" (LLs). A LL is one key element of the system disclosed in the "Description" section below. Theft identifying inventions have cropped up in the past using LL's. For instance, many theft preventing devices using LL's have been patented for preventing the theft of cars. Three examples:

T. McNally, Jr. (U.S. Pat. No. 1,249,798) discloses a sign which is locked over a car's license plate. The sign says, "STOP THIS CAR IF IN MOTION". This sign cannot be removed by a thief without destroying the license plate. M. Downey (U.S. Pat. No. 1,392,869) discloses a sign which is built into the side of a car. The sign can be locked into a position where it says "OWNER OUT". J. Hughes (U.S. Pat. No. 1,636,513) discloses a symbol with two matching elements, one detachable. If the detachable element is missing observers are supposed to realize that the car should be parked. In all these cases, if a thief puts the car in motion, the inventions allow observers to identify the car as being stolen.

These inventions do fall under the system disclosed below. Yet, they are all narrowly designed for motor vehicles (and in one case a bike (E. Andersen, Denmark, U.S. Pat. No. 437,983)) and do not disclose the system disclosed below. Moreover, they can only be changed back and forth between two messages, namely saying whether a car should be in use or not.

Methods related to LL's have been used to safeguard credit cards. Three examples: G. Gibson U.S. Pat. No. 3,583,317) discloses a credit card which can be physically separated into two parts. If both parts are not present, the credit card cannot be used. N. and L. Butterworth (U.S. Pat. No. 4,879,455) disclose a credit card which has digit keys on it and an electrical circuit inside connected to two Light Emitting Diodes (LEDs) which indicate whether the card should be accepted or rejected. Only when the proper Personal Identification Number (PIN) is entered will the green LED indicate "ACCEPT". In these kinds of systems, a thief cannot use a stolen credit card in a store because he or she cannot verify ownership.

Such methods are related to LL's because of the peculiar nature of credit cards. Credit cards are non-transferable and are only supposed to "work" when the owner's identify has been verified. The patented methods physically stop a thief from verifying identity. Hence these methods can be considered physical deterrence much like the yanking of the distributor cap from a car engine is physical deterrence. They can also be considered LL's because when the owner's identity has not been verified, the credit cards carry an implicit or explicit message, "DON'T ACCEPT." The owner can change this message by verifying his identity whereas a thief cannot. However, the methods above for protecting credit cards clearly are not suitable for protecting a wide variety of items.

H. Bochmann (U.S. Pat. No. 4,743,894) discloses a circuit which aids in the recovery of stolen car radios and certain other electronic equipment. The invention allows the owner to enter owner identification information into a radio's memory. This information can only be entered or changed after the proper PIN has first been entered. The information is displayed on the radio's display upon the pressing of a "recall" switch. Further, if the radio is ripped out of the car, the invention can lock the information on the display. This invention shares two similarities with the system below. First, the information can only be changed by the owner. Second, it is impractical for a thief to remove the information. Bochmann's circuit improves on the idea of a serial number. It can therefore deter theft.

It is however different from the system disclosed below. First, it does not prevent theft by indicating that an item is stolen. It is possible that it can do this by displaying the rightful owner of an item. Still, this information does not by itself imply that an item is stolen. The item might just be in the hands of a friend of the owner. Second, the information can be removed from the display with the press of a button. Therefore, a thief is not forced to leave the information showing. In the case where the information is locked onto the display because the radio has been removed from its source of power, this invention can more rightly be considered an alarm with a physical deterrence feature rather than a passive system which is not tripped and which does not affect the functioning of the item it is on. Third, this invention is limited to electronic items which have memory, input and display elements. People who see the invention above probably will not know whether the item it is part of is stolen and even if they do suspect it is stolen, few will be prompted to take action. People who see the system below will know whether the item it is part of is probably stolen and many will be prompted to take action.

OBJECT

The object of the invention is to provide an inexpensive, easy to use system of labelling, suitable to a very wide variety of items, which should deter the theft of said items.

SUMMARY

A method that achieves the object above comprises, in combination, four required elements.

1) A readily understandable message on an item which describes the state the item should be in and asks observers to take appropriate action should the item not be in that state.

2) Said message must be easily detectable by people near it.

3) Said message must be changeable, at least once, to reflect a change in the state of the item it is on but, must be changeable only by the owner and anyone he or she chooses.

4) Said message must be very difficult to tamper with and hide (except by special methods controlled by the owner) without leaving an obvious trace.

*This combination of elements will be called an ID4.*

BRIEF DESCRIPTION OF FIGURES

FIGS. 3 and 4 show a message and symbol which can be applied to an ID4 protected item, thereby making impractical the removal of the rest of the ID4.

FIGS. 14-18 show a multi-state, combined visual parts ID4 applied to a Fax machine.

FIGS. 20-25 show a two-state, microprocessor controlled ID4 applied to a tape player and a car.

MORE DETAILED DESCRIPTION OF THE FOUR REQUIRED ELEMENTS

Figure 1:
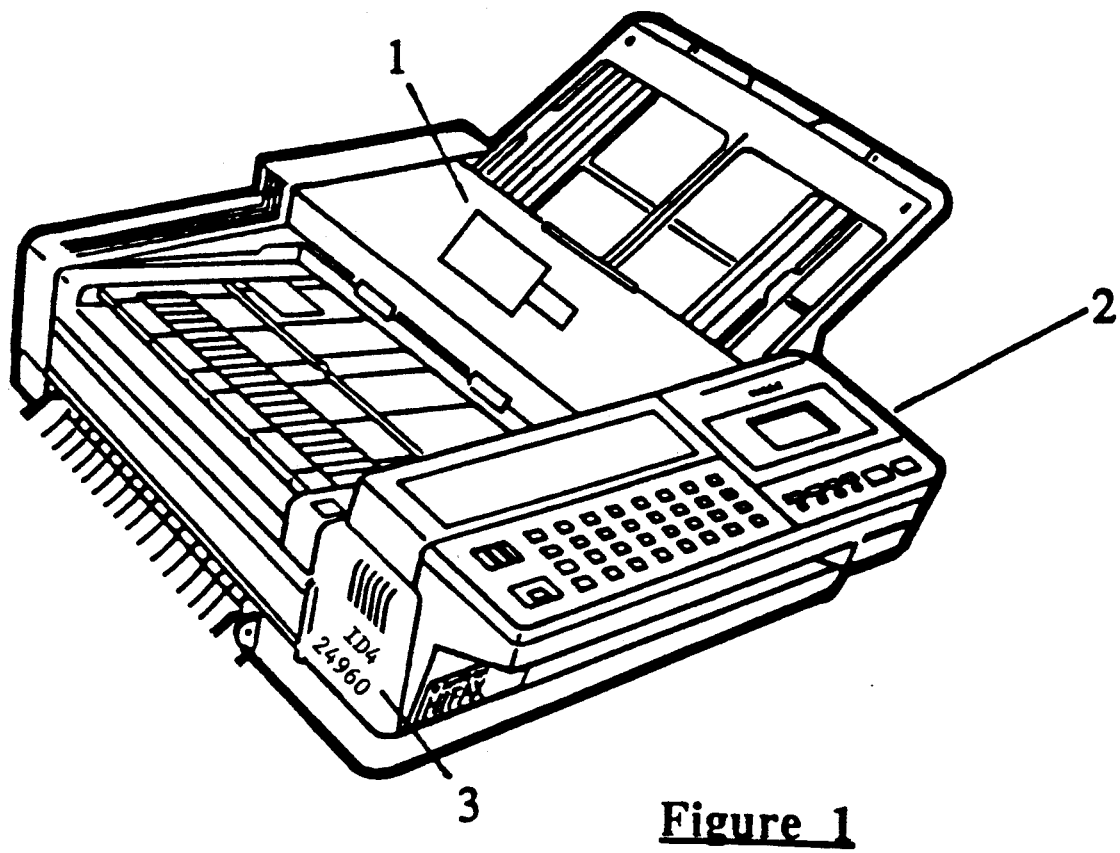
FIGS. 1 and 2 show a two-state, mechanically locked ID4 applied to a Fax machine.

1) A readily understandable message on an item which describes the state the owner intends the item to be in and asks observers to take appropriate action if the item is not in that state.

Purpose: People will be deterred from stealing an item if that item can "announce" that it is stolen. An item can do so if a message is on it which describes the state the owner intends the item to be in. Observers can then see if the item is actually in that state. If it is not, they can contact the police or take other appropriate action.

Implementation: The message must be readily understandable without special knowledge or detection equipment on the part of an observer. Depending on the item it is on, the message can have any size, shape and appearance. This much is obvious because signs come in all forms. Perhaps not as obvious is that the message can be electronically controlled and therefore have a very wide variety of electronic forms. Just five examples: it can be a few words on a liquid crystal display (LCD) or a full electronic sign displayed on a screen or an LED flashing S-O-S or an electronically activated deadbolt lock with "DON'T USE" written on the exposed bolt or an audio chip bleating out "DON'T USE" at regular intervals.

In describing the intended state of the item, the message can be infinitely diverse but need only be made up of some combination of one or more of the following pieces of information:

a) Whether Use Is Authorized, e.g., "*This Item Is Not Useable.*" A thief may take an item but he or she cannot use it in public for everyone nearby will see that the item is not supposed to be in use.

b) Intended Location, e.g. "*This Item Belongs At _____.*" An observer can easily compare where the item is with where it should be.

c) Authorized Operator (and Owner), e.g., "*This Can Be Used By _____/Belongs To _____.*" Observers can see whether an authorized person is using a given item. Further, if the item is stolen its ownership can be traced.

d) When Use Is Authorized, e.g., "*This Item Is Not To Be Used After _____.*" Observers can see whether an item should be used at a given point in time. Rental companies might, for example, include this information.

The message 11, see FIG. 3, would be completed by instructions telling observers what to do if the item was not in its intended state. Though the instructions could be infinitely diverse, they would essentially say:

"If this item is not in its intended state, take it to the proper authorities or notify the proper authorities."

(It is important to note that the message need not be spelled out with words. All or part of it can be abbreviated by other symbols. It is only necessary that when an one sees the ID4, he or she understands or infers the message outlined in this section.)

It should be pointed out that a person enters into a contract when he or she buys an ID4 or buys an item having one. This contract, whether explicit or implicit, is extremely important because it makes an ID4 credible.

First, the buyer agrees that he or she will never remove, conceal or alter the ID4 (an exception is made for portable ID4's see section 4). This way, if people see that an item had evidence of a removed, concealed or altered ID4, they will RIGHTFULLY suspect that the item has been stolen. If it were commonplace for owners to remove, conceal or alter their ID4's then people couldn't be sure whether an item, with a removed, concealed or altered ID4, was stolen or not. The ID4 would lose its credibility.

Second, the buyer agrees that if any person sees his or her item not in the state described by the ID4, that person has the right to: a) call the police and have the item confiscated and b) take the item himself to the police or a private company like the one described below (the owner, *if present*, could prove that the item was not stolen.). The police or the private company, whichever takes custody of the recovered item, should have the right to demand a recovery fee from the owner. Forcing the owner to pay a recovery fee could be important for it would give owners an incentive to make sure that what the ID4 states is correct (i.e. that the ID4 does not wrongly lead people to believe that an item is stolen) thus insuring that the ID4 is credible. Credibility is extremely important because an ID4 would be ineffective if people did not believe what it said.

Third, the buyer agrees to give or sell his or her item with an ID4 only to someone who agrees to the two conditions above.

An extra, *optional* message can be added to an ID4. This extra message would say essentially:

"Reward offered for information leading to the conviction of anyone connected with this item if it is stolen.

Also, this item is secretly marked to verify ownership."

(An ID4 with this extra message is will also be referred to as an ID4.)

Purpose: Potential thieves will be further deterred from stealing an ID4 protected item if everyone around them has an incentive to turn them in. Just as important, the people thieves sell to will be deterred from buying such an item for fear of being turned in themselves (their crime would be accepting goods which are stolen or suspected of being stolen). Hence, the market for stolen goods could shrink, further reducing the reward for stealing. And if items are secretly marked, potential thieves will be deterred even more because they will know that they cannot obliterate all evidence of who owns the items they might steal.

Implementation: Owners or manufacturers of an item could offer the reward. Alternatively, an organization could be created; call it THEFTSTOP. (The police could do everything THEFTSTOP would do but it might be better for a private company to administer the ID4 system with the help of the police where necessary.)

One way (certainly not the only way) THEFTSTOP might work is the following. If a person saw an item, say a VCR, that was not in the state its ID4 specified or that had evidence of a removed, concealed or altered ID4, this person would take the VCR to THEFTSTOP or call THEFTSTOP. If the person called, THEFTSTOP would call the police who would recover the VCR and then take it to THEFTSTOP.

To get the VCR back, the owner would have to pay a small recovery fee. If someone was caught in connection with the theft, *this thief would pay* recovery costs, including reward money, to THEFTSTOP. The person who reported the VCR would get the reward money but only in the case of a conviction*. Otherwise, thieves would have an incentive to lie and say that an ID4 was registering wrongly and, for the reward, turn in an item that shouldn't have been turned in.

*It is possible that a thief could settle with THEFTSTOP and pay cash damages rather than be prosecuted.

THEFTSTOP can become a national registry of stolen property. People who have items stolen would report to THEFTSTOP and pay a small fee, say $1 through a "1-900" number, to have information about their stolen item registered. Then THEFTSTOP could easily return recovered items to their rightful owners. An important problem though with returning stolen items is that thieves often remove all trace of the owner's identity especially the serial number. Thus, it can be difficult to verify who the rightful owner is. It would be far easier if the owner had previously put a secret mark on the item, for example, a scratch the bottom of it. This scratch could identify the owner whereas a shaved off serial number could not. If a secret mark was shaved off, it could still identify the owner by its unique position. In addition, a thief might not know a secret mark from an accidental one and therefore would not even know to remove it. If a thief knew that a secret mark was on an item, he or she would therefore be deterred from stealing the item.

Figure 4:
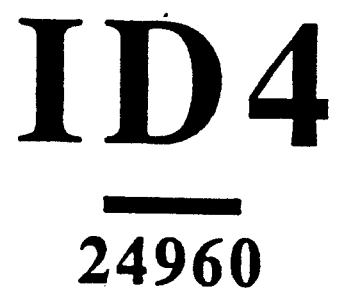

FIG. 4 discloses a separate symbol 12 which can be applied to the item, thereby making it impractical to remove the entire ID4.

2) Said message must be easily detectable by people nearby.

Purpose: If the message on an item is obvious to everyone nearby and says, for example, "THIS ITEM IS STOLEN", then a thief cannot hide that the item is stolen.

Implementation: The most obvious way to make the message easily detectable is to make it clearly visible *at all times*. It is possible though to have the owner control when the ID4 is visible. Regardless, once the ID4 is made visible, it must be easily detectable. For example, a removable piece, like a puzzle piece, could be part of an item. When detached this piece would clearly reveal an ID4 saying, for instance, "Item Not To Be Used. Call Police If In Use." When attached, this "puzzle piece" (difficult to counterfeit) would cover the ID4. Or, for example, the ID4 could be shown, only when the owner so desired, on the display of an item like a stereo. It is also possible that, for aesthetic and functional reasons, the ID4 might be out of sight in a known, standard position so it would still be easy to check.

3) Said message must be changeable, at least once, to reflect a change in the state of the item it is on but, must be changeable only by the owner and anyone he or she chooses.

Purpose: The message must be changeable so that if the owner of an item changes the state of the item, the message can be changed to reflect the new state. But, the message must not be changeable by any thief. That way, if a thief steals an ID4 protected item, the message will give him or her away.

Implementation: Even the owner should not be able to change the message except by using some special method not available to any thief. At the minimum, it must be possible for the owner to change the part of the message that describes the intended state of the item. It is possible that the whole message can be changed, for example, in the case of an electronic sign which can be electronically changed as the owner desires. The ways of applying a message so that nobody can change it are discussed in section 4 below. This section, 3, discusses the infinite ways to allow ONLY the owner and anyone he or she chooses to change the message. These ways all exploit the following fact of nature:

Often a thing can be split into parts
which can be exclusively possessed
and without which the thing will not function.

Consider the classic treasure map cut up between three people. When the three pieces are together the map is worth a fortune but, if one piece is missing, the map is worthless. Likewise a car won't work without an ignition key, a check without a signature, a lock without a combination, an ATM card without a PIN.

Below are three general ways of restricting who can change a message.

A) Mechanically Lockable Messages

There are two basic types of mechanically lockable messages.

Figure 2:
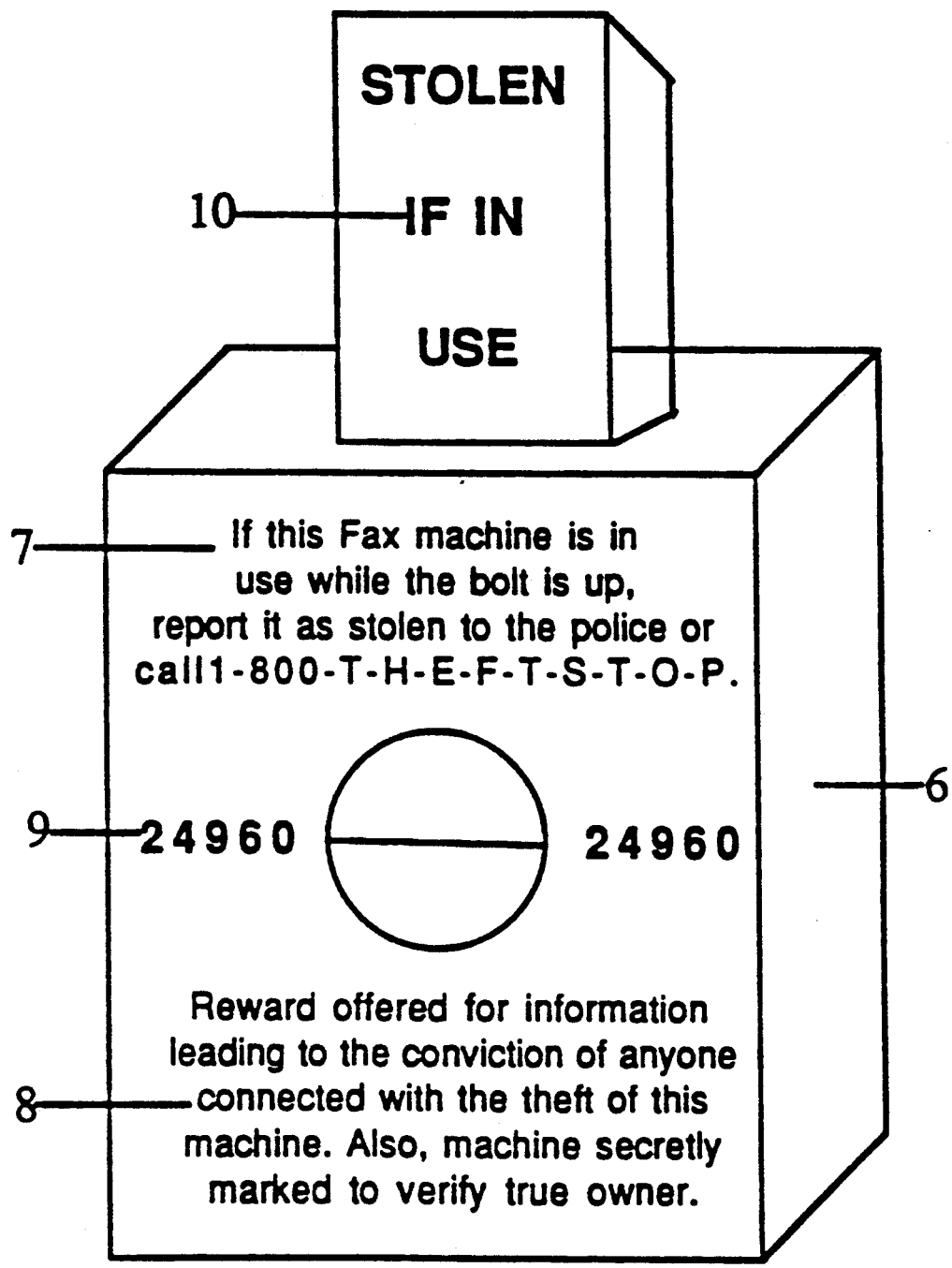

A1) Most mechanical locks can be in two states, locked and unlocked. They can therefore lock a message in two possible states. In one state, the message will usually say that an item is useable; in the other, it will usually say the item is not useable. However, a two-state message can signify any two states, for instance, that an item should be in New York or in California. It is also possible that a lock could lock a display on one out of a variety of messages. For instance, a lock could be a control dial so that the dial could be locked into various positions, each denoting a different message. FIGS. 1-2 show a two-state, mechanical ID4 on a Fax machine.

A2) A lockable sign holder allowing a sign to be changed then secured. The sign could describe any intended state of the item it is on. For example, a lockable sign holder could be built into a Fax machine and the sign inside could read, "This Fax machine:
Can be used by employees of Bob Smith & Co. only.
It belongs at 566 W. 21st Street, New York, N.Y.
If this machine is not in the state described by this sign,
please notify police or call 1-800-T-H-E-F-T-S-T-O-P."

(There are no figures showing this type of ID4 because the reader can easily imagine a lockable sign holder having a sign like the one above.)

B) Combined Visual Parts Messages

In which two* visual parts form one message when combined and form another when separate.

*It is possible that the second part can be split up into several parts each with a different piece of information. But the basic idea is the same.

One part, called the "first" part, tells (or implies):
what the "second" part should look like,
what the intended state of the item is when the second part is missing,
what to do if the item is not in its intended state.

This first part must be unchangeable, unconcealable and unremovable (except in certain cases by special methods available only to the owner).

When present, the second part changes the message to:
describe a different intended state for the item and
possibly, give different instructions about what to do if the item is not in that intended state.

The key to the combined visual parts ID4 is that only authorized persons have access to the second part and so only authorized persons can change the message. There are three types of combined visual parts messages.

B1) Once-changeable messages–in which the second part is added *permanently* to the item.

FIGS. 5-8 show this version applied to a book and a pair of jeans.

This type of ID4 could be useful for preventing shoplifting. For instance, it is possible that an ID4 could become an expected feature, like a bar code. That way, if someone was carrying around an item without the second part of its ID4, people would know the item had been shoplifted.

B2) Messages with two possible states that can be changed back and forth—in which the second part is removable.

FIGS. 9-13 show this version on a Fax machine.

Usually, the presence of the second part will signify that an item can be used while the absence will signify that it cannot.

B3) Messages with multiple possible states—in which there is more than one possible second part. The variety of possible second parts allows a variety of possible intended states to be described.

FIGS. 14-18 show this version on a Fax machine.

In all ID4's with combined visual parts, the unremovable, "first" part can be applied to an item in many ways. These are discussed in section 4 below. The "second" part, when removable, can be made removable in an infinite variety of ways. Below are some possibilities.

The second part can be slipped into a holder, snapped on, velcroed on, clipped on, pinned on, zippered on, buttoned on, post-it noted on, bolted on, applied with a magnet, made of a shape that fits exactly into an item and so on.

Clearly, there is an infinite variety of possible ID4's using combined visual parts. As long as the parts cannot be easily counterfeited and as long as they can fit on a given item, they can be of any shape, size, material and appearance.

C) Electronically controlled messages which change only after an input has been verified against an electronic memory.

FIGS. 20-31 show three microprocessor controlled ID4's which, to be changed, require the proper PIN.

The possible variety of electronically controlled ID4's is vast. A small sample of the possible inputs: an ID4 could change in response to the proper spoken command or the proper voice or to the proper fingerprints placed onto an optical sensor or the proper rhythm tapped onto a single key and so on. Certain electronic ID4's could come in sets of (say) one thousand to be applied to all of a company's pieces of equipment. A single input device could activate all these ID4's thus reducing their cost and making inputting easy and centrally controlled. With other ID4's the inputs could be entered with a remote control device or by a computer on a network. These comments barely hint at the possible permutations of ID4's based on electronically verified inputs.

4) Said message must be very difficult to tamper with and hide (except by special methods controlled by the owner) without leaving an obvious trace.

Purpose: An ID4 would be useless if a thief could, without leaving a trace, easily tamper with or hide it.

Implementation: There are many ways to make it impractical for a thief to tamper with or hide an ID4. One is to make the ID4 very difficult to remove, change and conceal. Another is to make it leave a trace if tampered with. A third is to make it both difficult to tamper with and make it leave a trace if tampered with. If a trace is left, the trace itself becomes the message (difficult to remove, change and conceal and implying, "It is intended that this item have an ID4 on it. The ID4 has been tampered with. Therefore this item is stolen. Please take appropriate action.").

It must be very difficult to change the ID4 by counterfeiting all or part it. The ways to defeat counterfeiting depend on the form the ID4 takes. It must also be very difficult to conceal the ID4. To be concealed, an ID4 would have to be covered in some way. This action would usually be obvious except in the case of items like bikes where repainting is common. An excellent strategy is to make an ID4 standard on a given item. That way people will expect to see it (better even is to make it standard in a certain position). Concealment would then be impossible and removal would have to be followed by replacement with a counterfeit. Stopping removal of the message is quite important. Infinitely many ways can make removal very difficult; below is a partial list of general ways.

A) An ID4 can be built into an item.

How it is built into an item depends on the item. With clothing, it might be woven in, with a T.V. it might be part of the plastic, with a bike it might be molded into the frame, with a stereo it might be part of the existing circuitry and display. The possibilities are infinite.

B) An ID4 can be irreversibly marked onto an item in numerous ways. Some examples: it can be stamped on, melted on, indelibly inked on, etched on, burned on, punched on or painted on.

C) An ID4 can be irreversibly attached to an item in many ways. Some examples: it can be glued on, nailed on, irreversibly screwed on, soldered on or melted on.

D) An ID4 can be locked onto an item. This type of ID4 would actually be portable. It would be more vulnerable to tampering but could still deter theft.

E) An ID4 can have a seal on it so that removal of the ID4 would break the seal which would signify that the item was stolen.

F) A second permanent message can be put on an item, in one or more places, (see FIGS. 3 and 4) which would say something like, "This item is protected by an ID4.

If the ID4 is missing, please report this item as stolen."

Since this message is just words or a symbol it would be easy to incorporate into an item, using the techniques above, so as to make it impractical to remove, change or conceal. It would usually be helpful to make this extra message match the rest of the ID4 in some way, for example putting identical numbers on both. That way, if a thief removed the ID4 and tried to replace it with a counterfeit, the counterfeit would not match the extra message. (If no other part of the ID4 was unremovably applied, this "extra" message would be the unremovable part).

Consider a thief's position upon seeing a personal computer with an ID4 on it saying: *"This computer belongs at Stanford U.'s Computer Science Department. If it is not there, report it as stolen. Reward offered for information leading to the conviction of anyone involved in the theft of this computer. Also, this computer is secretly marked to verify ownership."*

Now assume that the ID4 is built in as a known standard feature. Concealment of it would then be impossible. Removal of it to replace it with a counterfeit would be very difficult and could be made impractical with a tamper seal on the ID4. The question is, *would a thief want to steal this computer?* The answer is yes, but only if he or she intended to break it down for parts or never use it in public. This intention is rare in the theft of most items including a personal computer.

The scope of applications for ID4's is very great yet not obvious. To understand it, one must spend time considering the variety of items and situations ID4's can apply to. Three applications, because they are not obvious, may demonstrate.

One, an ID4 can protect a traveller's check. Imagine a traveller's check is not a check but a coin and imagine further that the coin (see FIG. 19) has a set of digit keys and an LCD on its face and a battery powered microprocessor inside controlling the display by way of the keys. The display would tell observers whether or not the coin was useable. If it said, "NOT USEABLE", nobody would accept the coin so it would be worthless. Only the owner of the coin could change the display from "NOT USEABLE" to "USEABLE" by entering the proper PIN. This coin would be virtually theft proof for no thief could use it. It would also be reuseable (because it would be transferable) and could be treated like currency whereas current traveller's checks can only be used once.

Two, ID4's can protect certain expensive parts inside machines. For example, the cartridge inside a laser printer is easily removed by anybody and costs around $200, and hence is prone to theft. Theft can be deterred if the cartridge has an ID4 with a reward message (the reward being offered (say) by the manufacturer).

People would then have an incentive to check the ID4 to find out if the cartridge was stolen or not (when the cartridge, normally hidden, is made visible, the ID4 is of course easily detectable). This cartridge is easy for anybody to check but checking the parts inside most machines is hard. Nevertheless, expensive parts usually work inside machines that require repairs. Repairmen can therefore become an unofficial theftstopping force.

Three, ID4's can protect items in inventories from employee theft. This kind of theft is a major problem and therefore the ID4 solution merits a few paragraphs of explanation. ID4's could protect, for example, the inventory of a consumer electronics store. Each piece of merchandise would have (say) a microprocessor controlled ID4 which, to be changed, would require the proper PIN. The PIN for each piece of merchandise would be held in a computer tied into the store's cash register. Separating the PIN from the ID4 would make theft more difficult because an employee would have to steal both an item and the PIN that went with it. In retail stores though many employees would have access to both. Theft could still be prevented. If a customer bought (say) a CD player, the sales clerk would check the computer to find the PIN to give to the customer. The computer would release the PIN only upon the sale of the item. So, to get the PIN, a sales clerk would have to ring in a sale. If a clerk tried to steal (say) a CD player, he or she would have to get the PIN by pretending that there was a sale. But, the cash register would then be short and the clerk could be found out.

If a combined visual parts ID4 was used, the clerk would have free access to the second part of the ID4 but, when taking that part, the clerk would still have to supply evidence of a sale. For instance, upon getting the ID4's second part, the clerk would have to put in its place a receipt for the item sold.

In a warehouse operation, each item of merchandise would have an ID4 on it. Whatever the type of ID4 used, the part controlling it would be in the possession of management. Most employees would not be in the position to steal both an item and the controlling part that went with it. If a manager, with access to both, wanted to take the part, he or she would still have to supply evidence of a sale (or shipment).

In sum, ID4's can reduce inventory "shrinkage" because:

1) the part that controls the ID4 on an item can be separated from the item thereby making it necessary for a thief to steal both the item and the separated part, 2) even when employees have access to the part that controls a given ID4, theft can be stopped by making employees supply evidence of a sale or shipment whenever they let that part leave the store or warehouse.

ILLUSTRATIONS OF THE INVENTION

Because ID4 is capable of deterring the theft of a very wide variety of items, one can't supply its "preferred embodiments." What is preferred varies too much with the application. For instance, what suits a Mercedes Benz might not a Chevrolet and certainly might not a computer. ID4 simply has thousands of viable embodiments and to say that one or five or ten are preferred is wrong. Hence, the embodiments below are for illustration only.

One ID4 Using a Mechanical Lock

A) FIG. 1 shows an ID4 1 built into a Fax machine 2. Also, melted into the Fax machine is a symbol 3 which is part of the ID4 and is shown in detail in FIG. 4.

A deadbolt lock 6 is shown in FIG. 2. Stamped onto the metal of the lock is a message 7 saying, "If this Fax machine is in use while the bolt is up, report it as stolen to the police or call 1-800-T-H-E-F-T-S-T-O-P." Another message 8 says, "Reward offered for information leading to the conviction of anyone connected with the theft of this Fax machine. Also, machine secretly marked to verify true owner." A number 9 is also stamped on the lock to match the symbol part of the ID4 shown in FIG. 4. The symbol part reads, "ID4, 24960". This symbol implies a message that is actually the same as the one on the deadbolt lock. When the deadbolt is turned, the bolt becomes exposed. Stamped on the bolt is another message 10 saying, "STOLEN IF IN USE".

Three ID4's Using Combined Visual Parts

Figure 5:
FIGS. 5-8 show a once-changeable, combined visual parts ID4 applied to a book and a pair of jeans.
Figure 6:
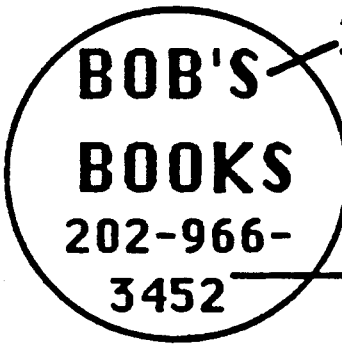

FIG. 5 shows, on the back of a book 30, the first part of a once-changeable ID4 31. This part is stamped on the book. FIG. 6 shows this part of the ID4 32 in detail. Printed on it is a message 33 saying what the second part should look like and what the absence of the second part means. Another message 34, says that a reward is offered for information leading to the conviction of anyone involved in the theft of the book. Below these messages, is an insignia 35 which is to be matched by a duplicate insignia, the second part of the ID4. The insignia includes the phone number 36 of the bookstore so that the theft of the book can be reported easily.

Figure 7:
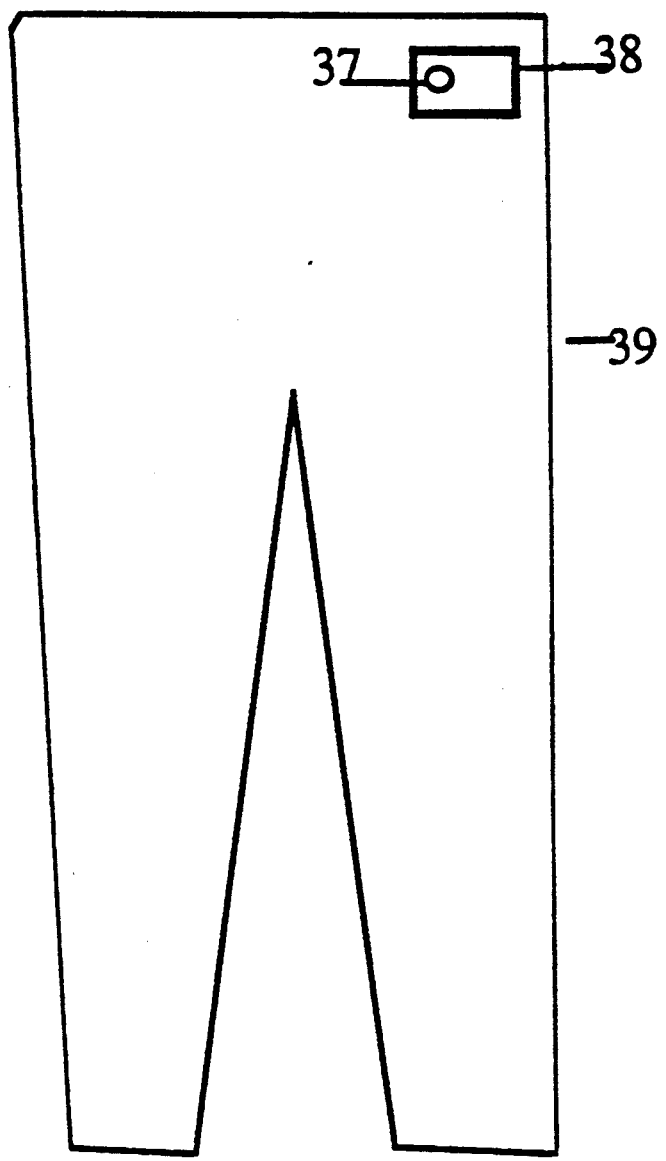
Figure 8:
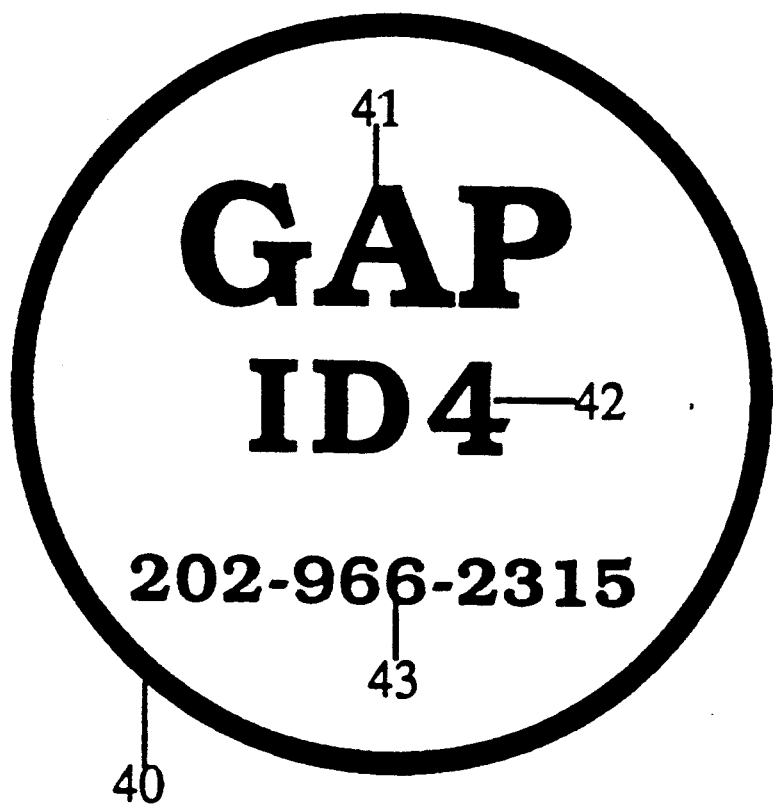

FIG. 7 shows a once-changeable ID4 37 which is burned into the leather patch 38 on a pair of jeans 39. This ID4 says the same thing as the ID4 shown in FIG. 6 but in symbol form. The abbreviated first part of the ID4 40 is shown large in FIG. 8. An insignia 41 is followed by an ID4 marking 42 which is a symbol telling observers that a matching insignia should be present, and that if it is not the jeans are stolen, and that a reward is offered for information leading to the arrest of anyone involved in the theft of the jeans. A telephone number 43 makes it possible to report the jeans if stolen.

Figure 9:
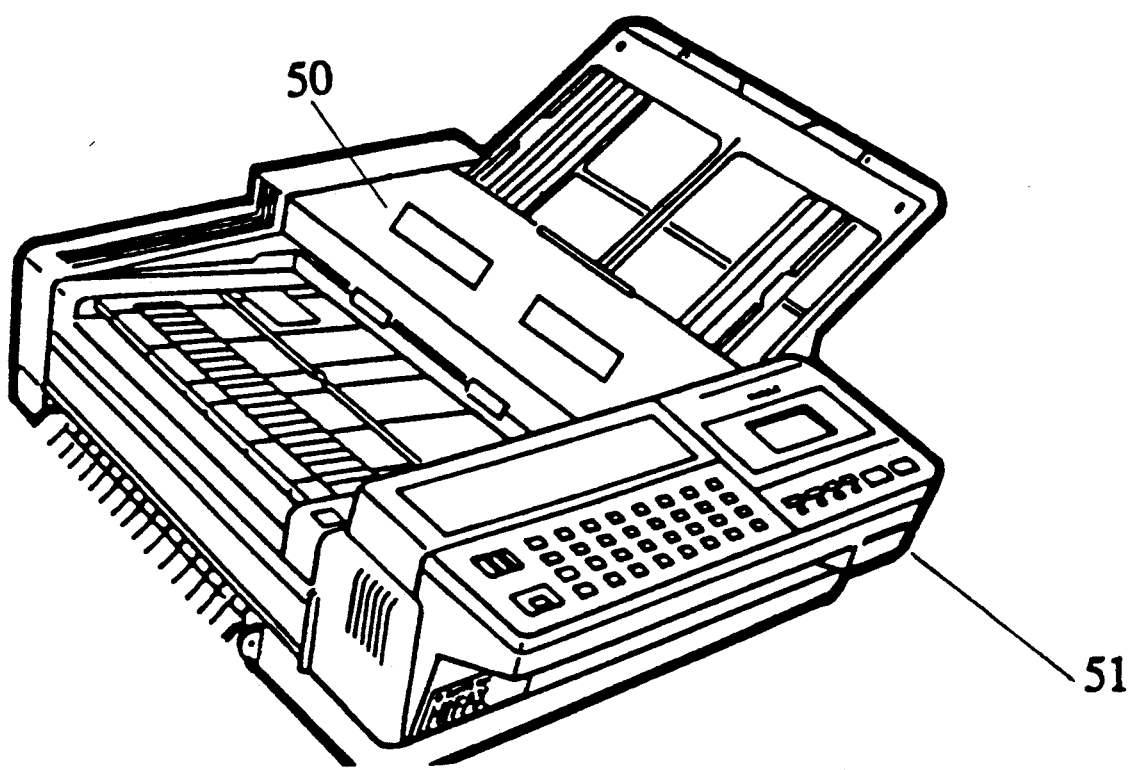
FIGS. 9-13 show a two-state, combined visual parts ID4 applied to a Fax machine.
Figure 10:
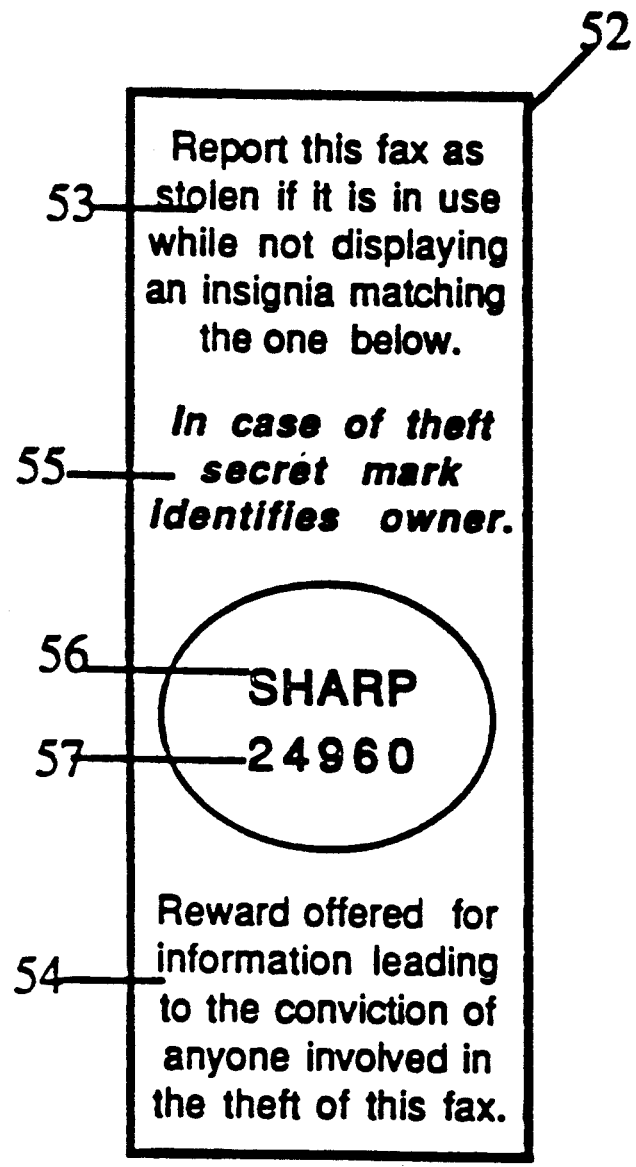
Figure 11:
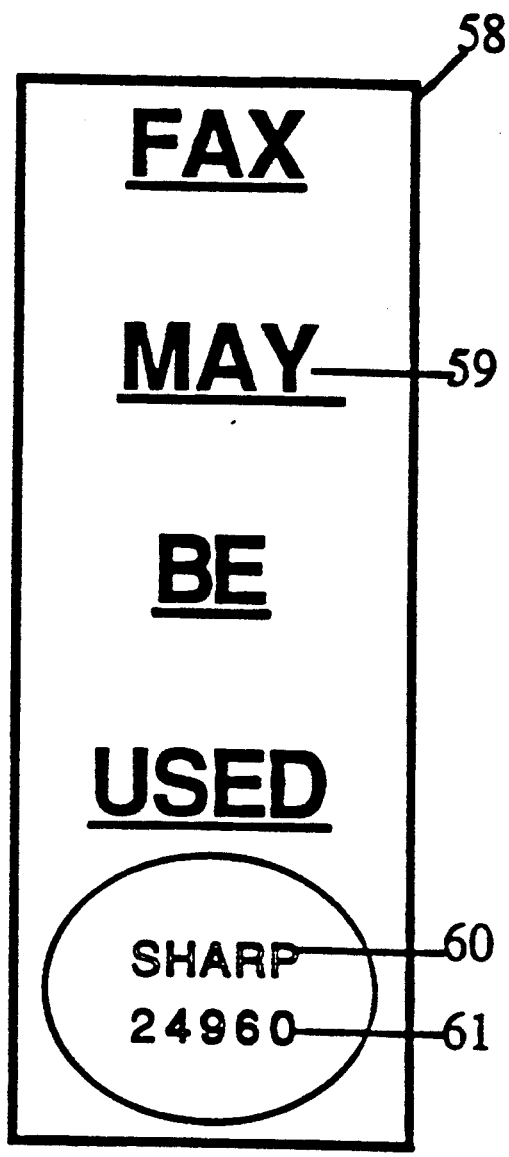
Figure 12:
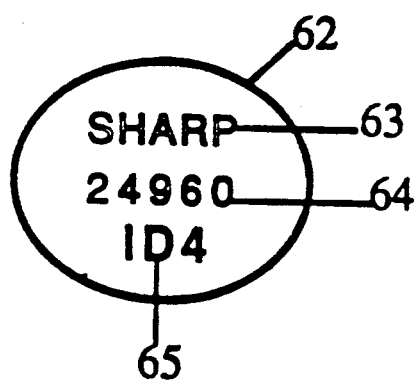
Figure 13:
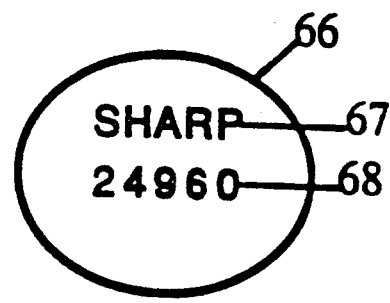

FIG. 9 shows a two-state, combined visual parts ID4 50 applied to a Fax machine 51. FIG. 10 shows the first part 52, which is built into the Fax. It has a message 53 which tells what to do if the Fax is in use when a matching insignia is missing. Another message 54 says that there is a reward offered as in the previous ID4. Another message 55 points out that the Fax has been secretly marked to verify the owner's identity should the Fax be stolen. The insignia 56 must be matched by a duplicate insignia on the ID4's second part. The number below the insignia 57 is there so that a removable second part from a different Fax cannot be substituted for correct second part. FIG. 11 shows the removable second part 58 which is made of plastic and slips into a holder on the Fax. The second part has a message on it 59 which is not necessary but helpful as it announces that the Fax can be used. Below is the matching insignia 60 demanded by the first part along with the matching number 61. FIGS. 12 and 13 show the same ID4 in abbreviated form. The first part 62 has an insignia 63 and an identifying number 64 and an ID4 symbol 65 which signifies: a) to be in use the Fax must display a matching insignia, b) that the Fax is specially marked to verify ownership and c) that there is a reward offered for information leading to the conviction of anyone involved in stealing the Fax. The second element 66 has the requisite insignia 67 and identifying number 68.

Figure 14:
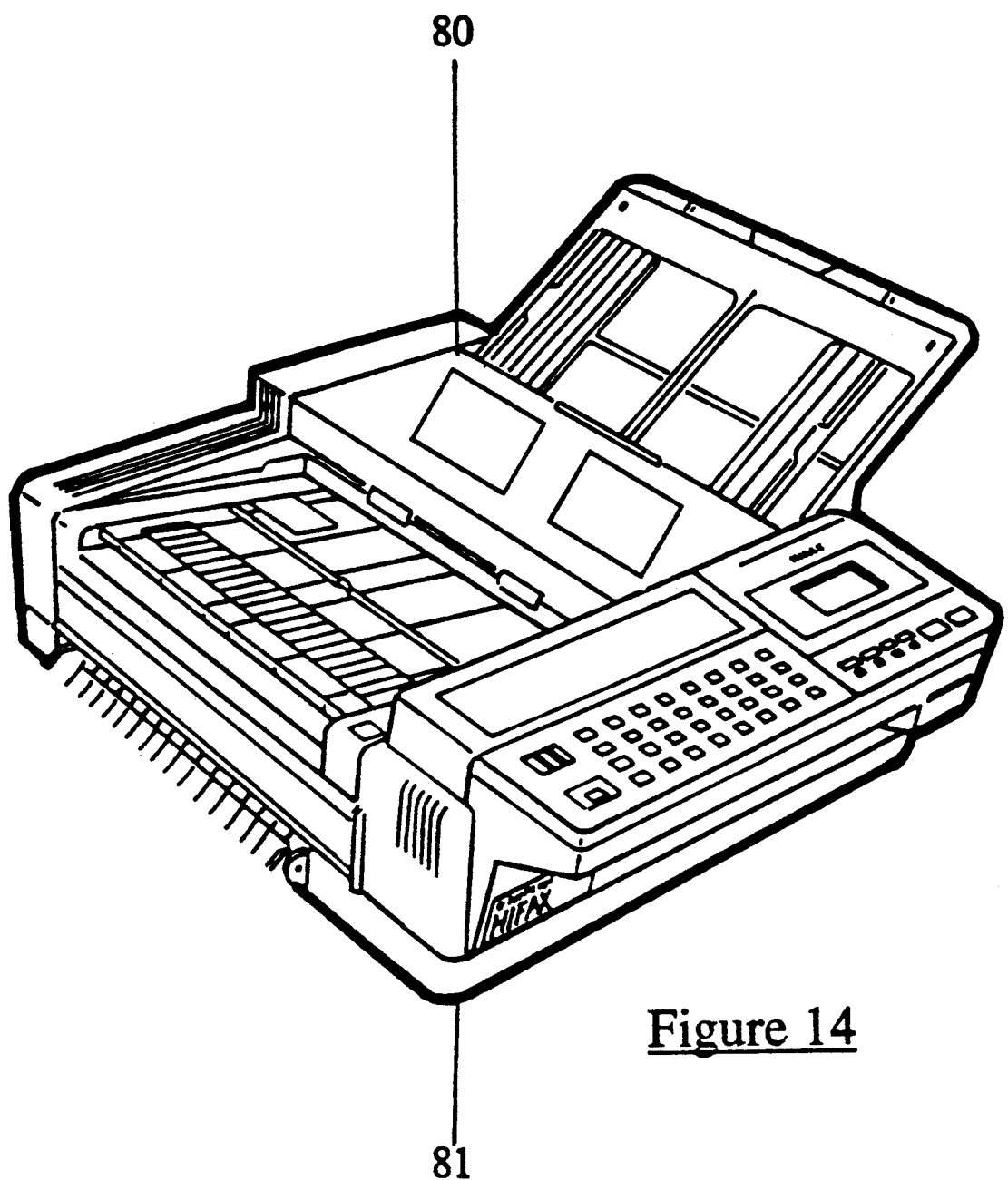
Figure 15:
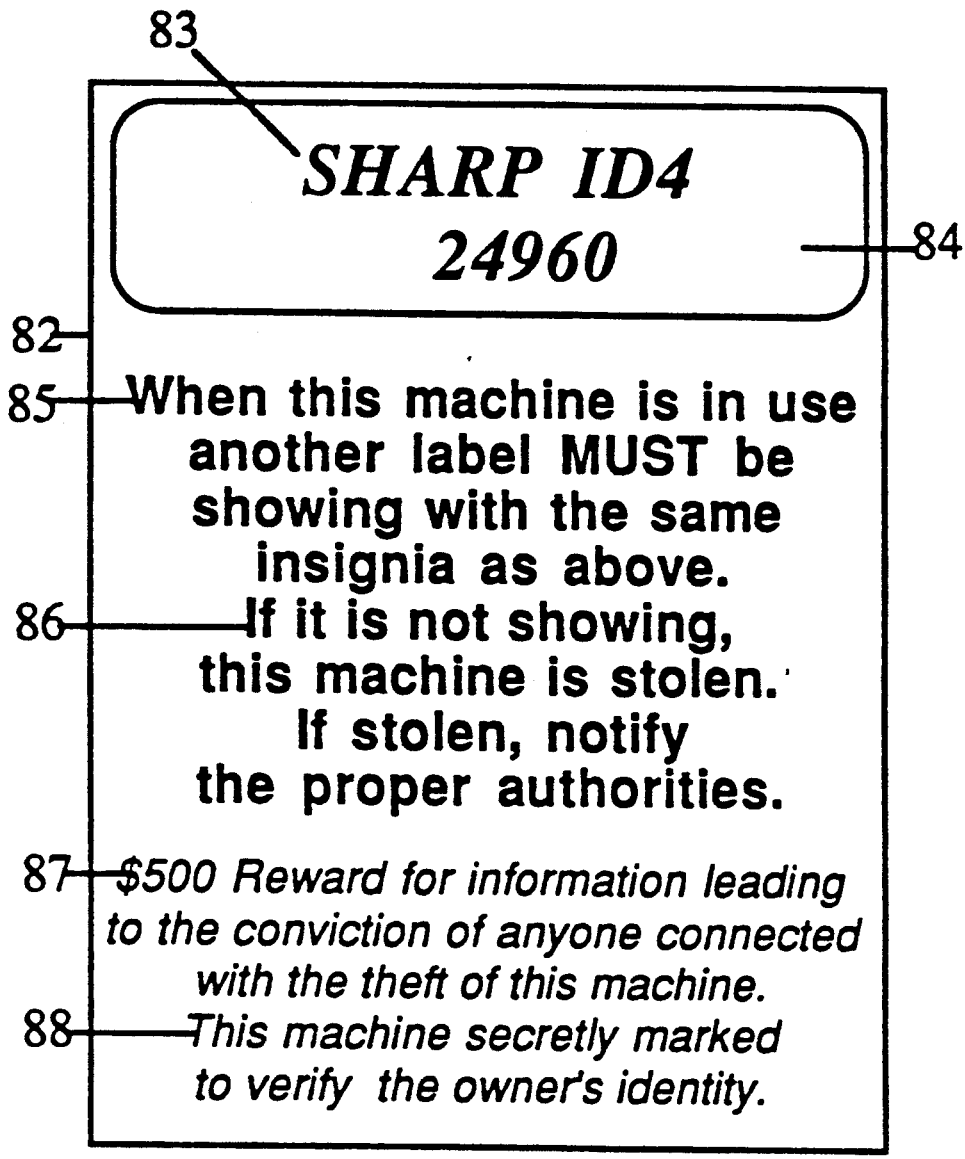
Figure 16:
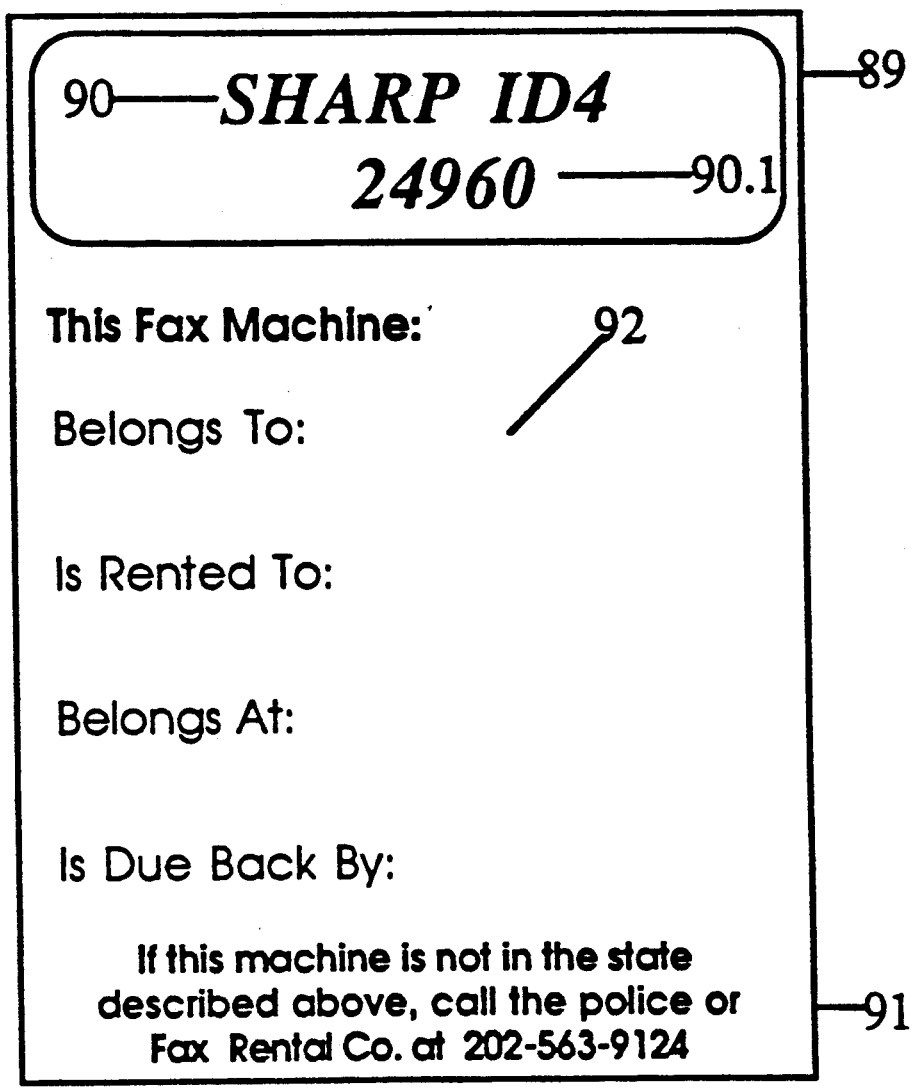
Figure 19:
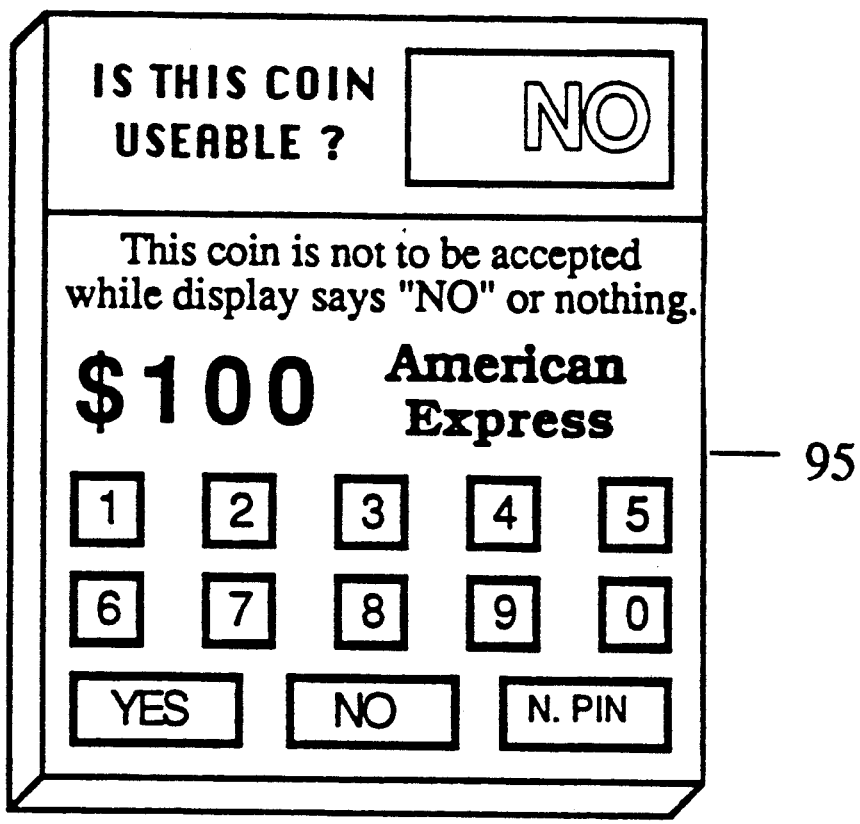
FIGS. 19 shows an ID4 protected traveller's "check" (the check is in coin form).

FIG. 14 shows a multiple state, combined visual parts ID4 80 built into a Fax machine 81. FIG. 15 shows the first part 82 in detail. The first part has an insignia 83 which is numbered 84. A message 85 is below saying that a matching insignia must be showing for the Fax to be used. Another message 86 tells observers what to do if the Fax is being used without authority. As in the previous ID4's above, another message 87 offers a reward and yet another message 88 says that the item secretly marked to verify ownership. FIG. 16 shows the second part 89 in blank form. It carries the requisite insignia 90 and matching number 90.1 and on the bottom a message 91 telling observers what to do if the Fax is not in the state described by the information specified 92 when the blank space is filled in. The second part can be filled in with whatever information applies and can be changed by tearing up the second part (which is paper) and filling in a new second part (of course the paper would be difficult to counterfeit, like a dollar bill). Two hypothetically filled in second parts 93, 94 are shown. FIG. 19 discloses an ID4 protected traveller's check, in the form of a coin 95.

Three ID4's Using Microprocessors

Figure 20:
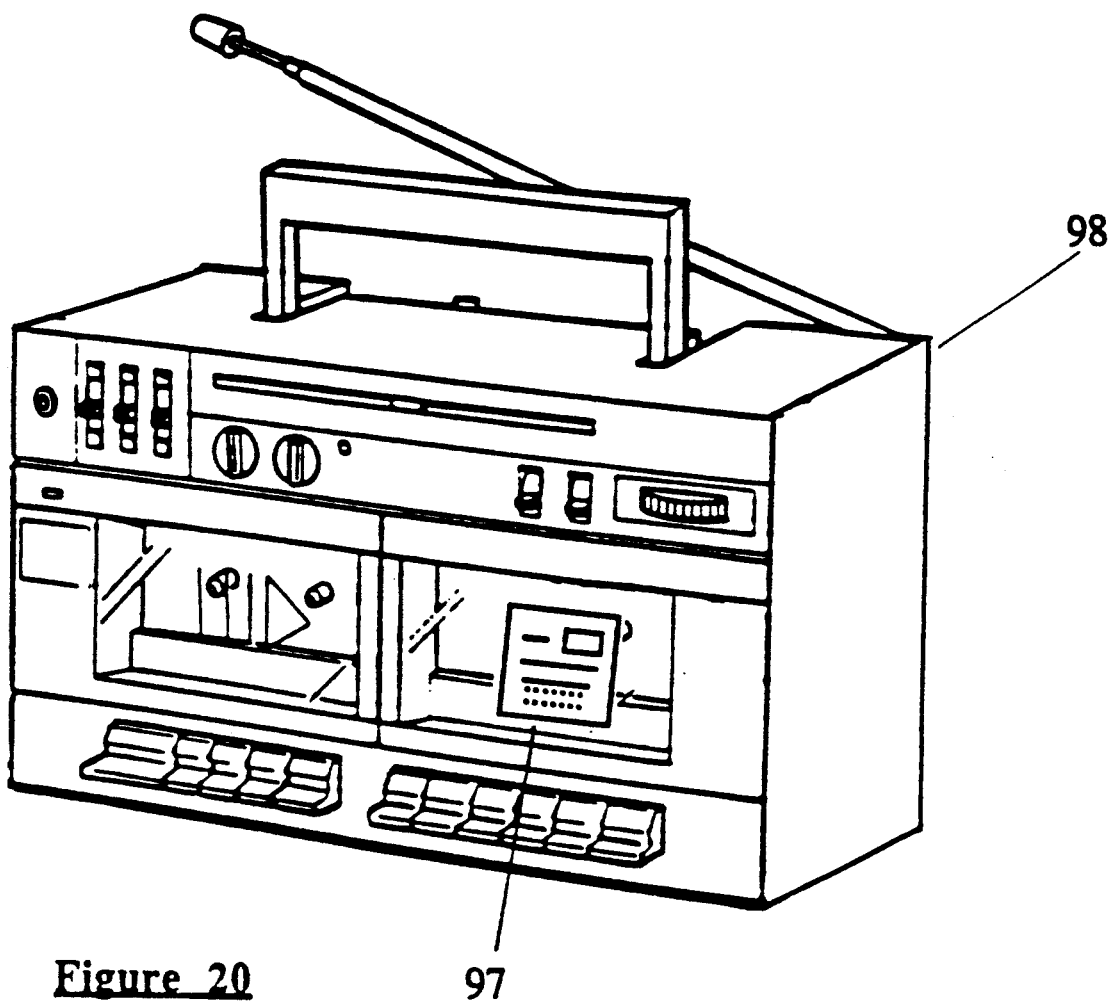
Figure 21:
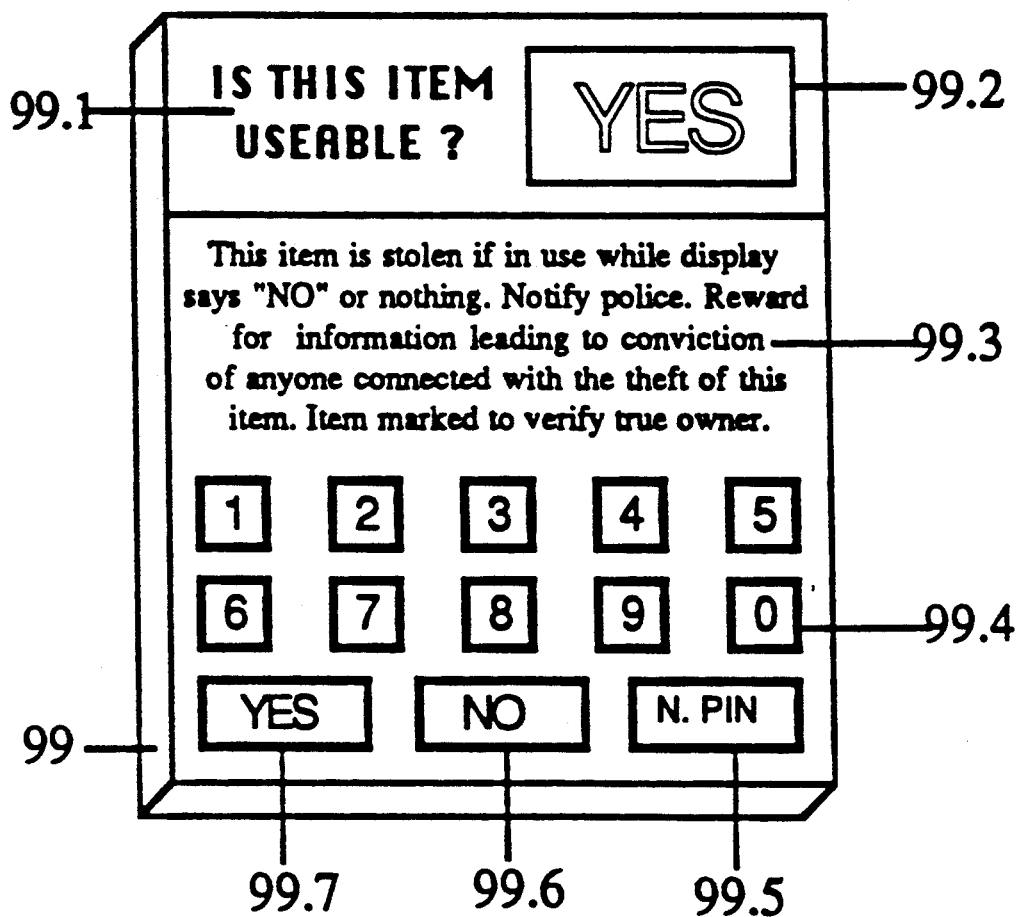

FIG. 20 shows an ID4 97 attached to a tape player 98. FIG. 21 shows the ID4 in detail. The housing 99 is plastic. Printed on the top of it is the question, "IS THIS ITEM USEABLE?" 99.1. Directly next to the question is the answer, "YES" or "NO" displayed on an LCD 99.2.

Below this message is another message 99.3, printed on the housing, saying, "This item is stolen if in use while display says "NO" or nothing (if power was cut off, the battery would have to be replaced before the item could be used in public). Reward offered for information leading to conviction of anyone connected with the theft of this item. Item marked to verify true owner.".

Below this message are ten digit keys 99.4, a "N.PIN" key 99.5, a "NO" key 99.6 and, a "YES" key 99.7. The housing contains switches for the keys, a battery, a microprocessor (with non-volatile memory) and circuitry to connect all these. Should the battery run out, it can be replaced from the side of the housing.

The LCD can display either "YES" or "NO". If it is displaying "YES", anyone can change it to "NO" by pressing the "NO" key. If it is displaying "NO", one can only change it by first pressing the "YES" key and then entering the proper PIN, which is always six digits long.

To change the PIN, the LCD must read "NO". One has to press "N.PIN" then enter the PIN and then enter another sequence of six digits which become the new PIN.

Figure 21A:
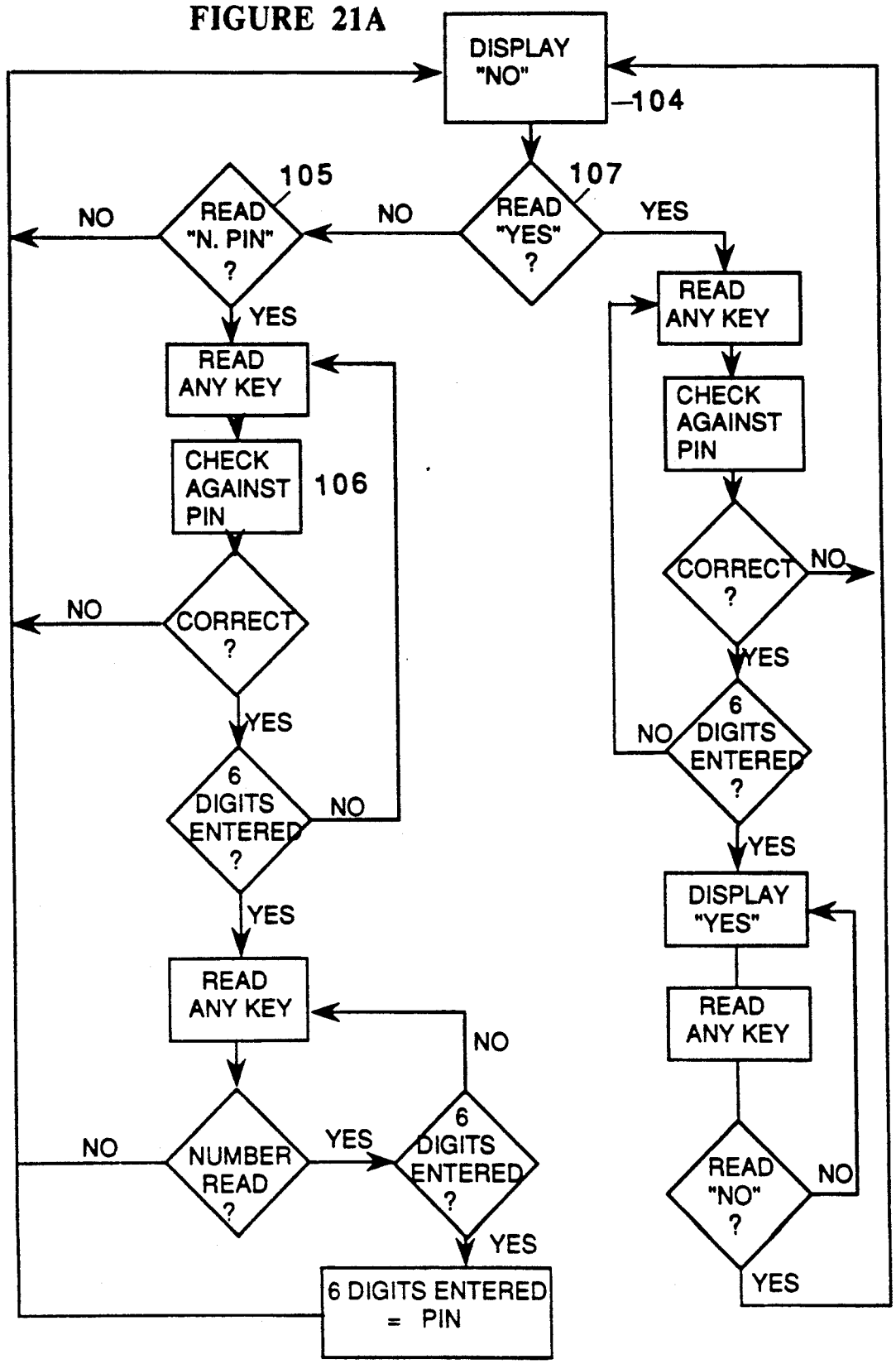
FIGS. 21a shows the flow chart for the microprocessor directly above.

A microprocessor controls these functions as can be seen in the flowchart in FIG. 21a. If the LCD is in the "NO" 104 state, any key that is pressed will leave it unchanged. If "N.PIN" 105 is pressed in this state, followed by the correct PIN 106, followed by six digits, the device will have a new PIN. Should a PIN or a new PIN not be fully entered, the device will not change its state but will wait for the remaining digits to be entered. If a non-digit key is pressed when entering the new PIN, the ID4 will wait for a digit but if a non-digit key is pressed when entering the PIN, the ID4 will revert to the "NO" state. If "YES" 107 is pressed, the PIN can be entered. If the full, correct PIN is entered, the LCD will change to "YES". When in the "YES" state, any key pressed will have no effect except the "NO" key.

This ID4 can be attached to a wide variety of items with epoxy which makes removal quite difficult. Should the ID4 be removed, the removal would be obvious. FIG. 20 shows the ID4 on the door of a tape player. Hence, it deters a would be thief by being clearly visible and by causing significant damage if removed.

Figure 22:
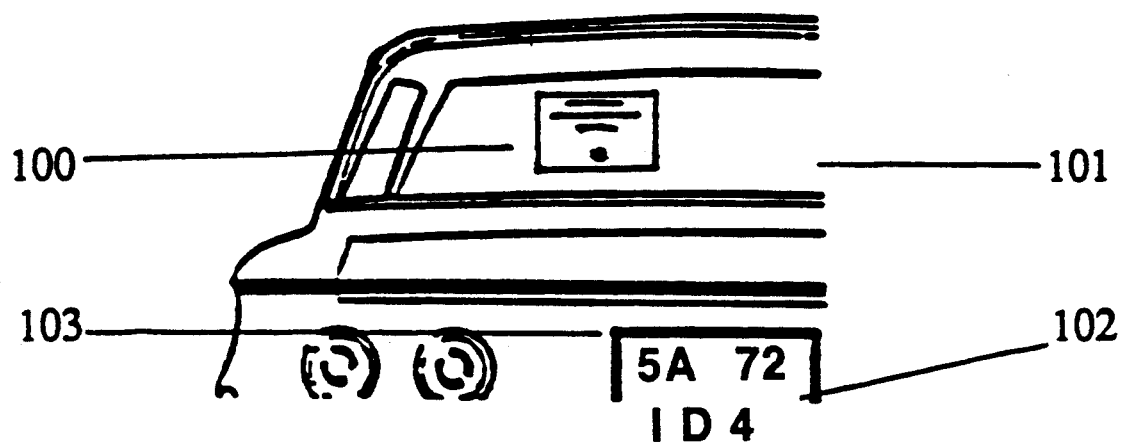
Figure 24:
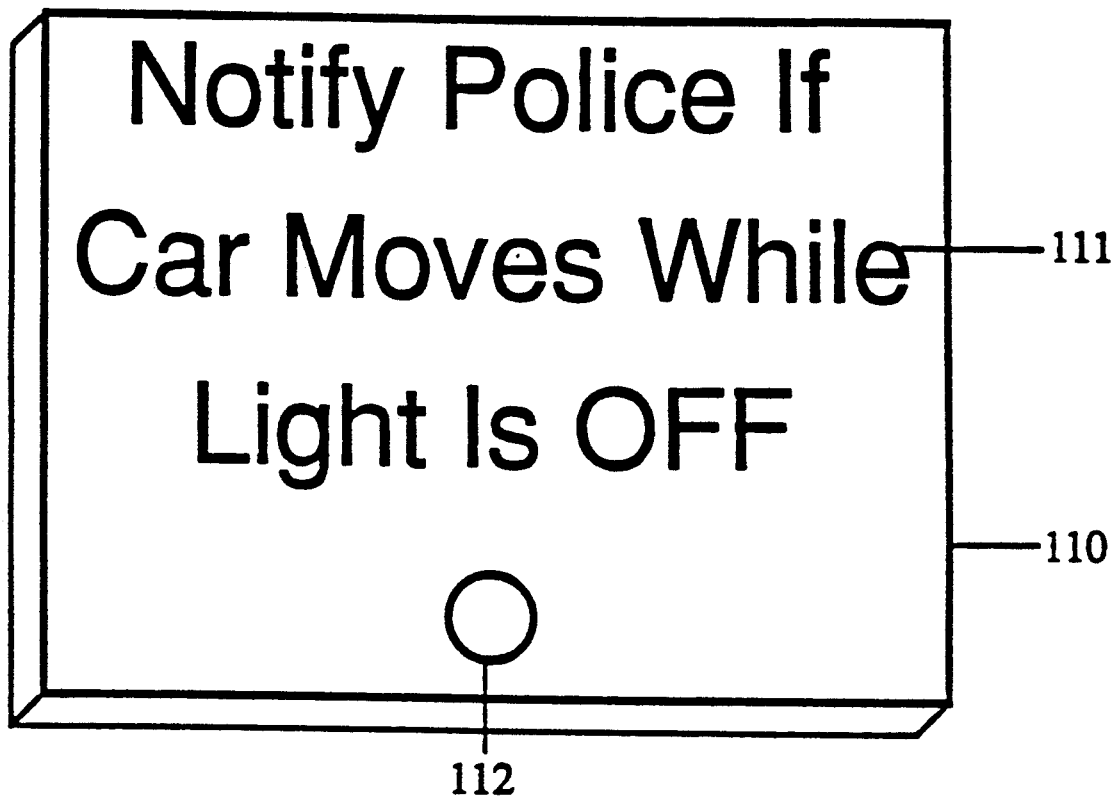
Figure 25:
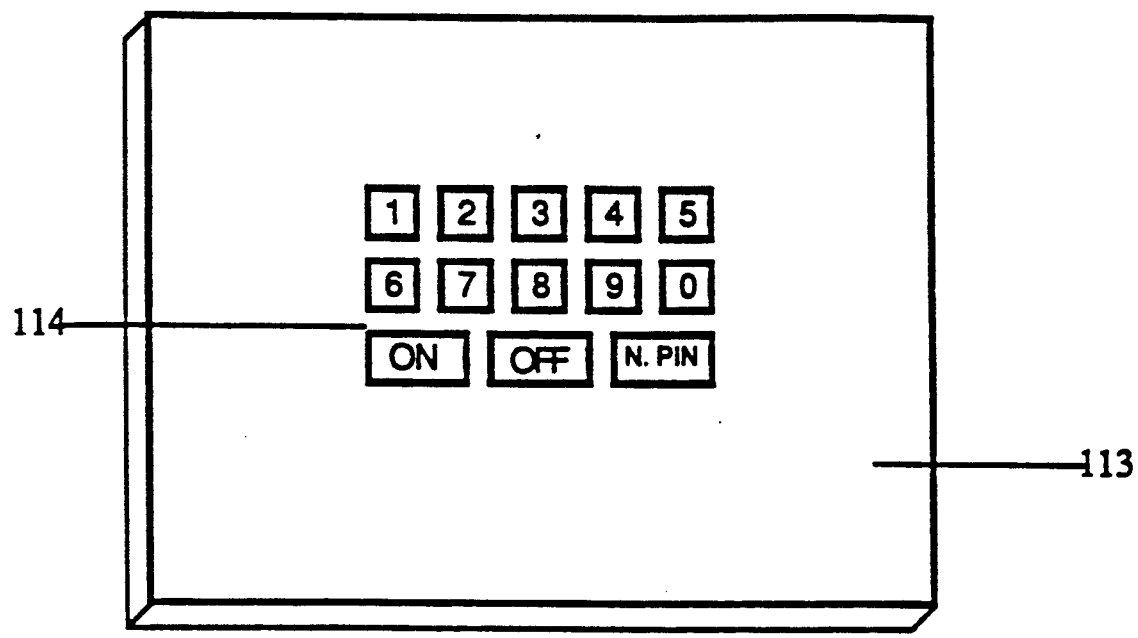

FIG. 22 shows another ID4 100, in this case attached to a car's rear window 101 along with an extra ID4 symbol 102, as in FIG. 4, soldered onto the license plate 103. This symbol informs observers that if an ID4 is not on the car, the car is stolen. FIGS. 24 and 25 show this ID4 in detail. On the front of the plastic housing 110 is printed, "Call Police If Moving When Light Is OFF" 111. Below this message is a green LED 112. On the back 113 are keys 114 which perform the same functions as in the previous ID4 except that "ON" replaces "YES" and "OFF" replaces "NO". The owner, upon getting out of the car, would press the "OFF" key which would turn off the LED. A thief could not turn the LED back on without knowing the PIN and hence would be deterred from taking the car which would announce that it was being stolen. On returning to the car, the owner would enter his PIN and the LED would turn on.

A microprocessor controls these functions in the same way as in the previous ID4 except that in the flow chart "READ 'OFF'" replaces "READ 'NO'", "TURN OFF LED" replaces "DISPLAY 'NO'", "READ 'ON'" replaces "READ 'YES'" and, "TURN ON LED" replaces "DISPLAY 'YES'". The housing contains a battery, switches for the keys, a microprocessor (with non-volatile memory) and circuitry to connect them all and the LED.

The front of this ID4 is epoxied onto the rear windshield of a car so that the message and LED can be seen, like a bumper sticker. Epoxy makes quick removal impractical without breaking the window which would attract the attention of observers and the police.

Figure 30:
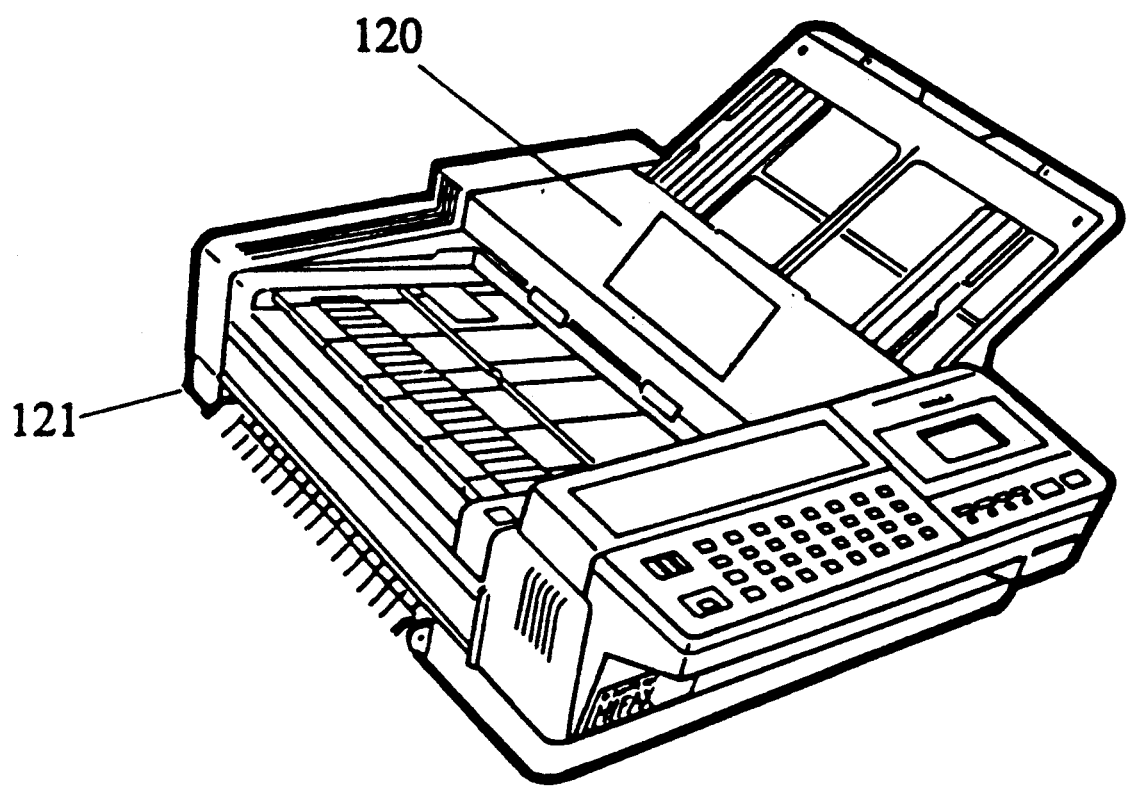
FIGS. 30 and 31 show a multi-state, microprocessor controlled ID4 applied to a Fax machine.
Figure 31:
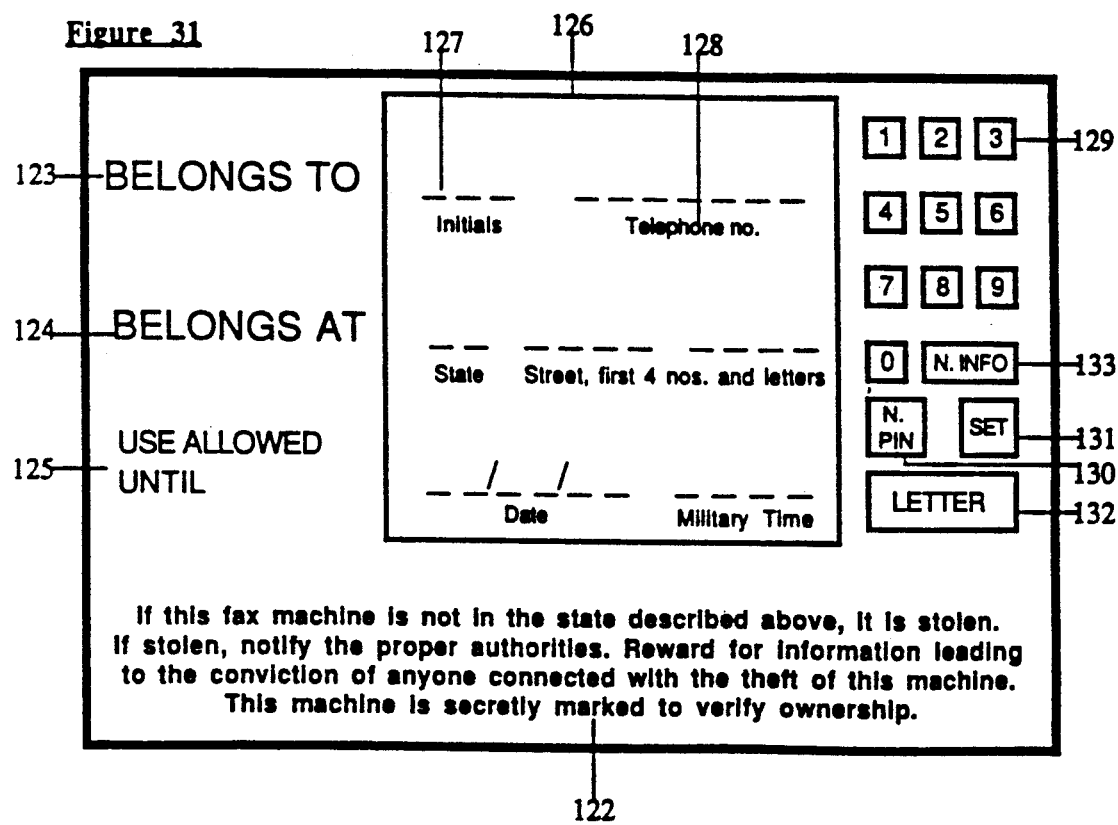

FIG. 30 shows another ID4 120, in this case built into a Fax machine 121. FIG. 31 shows this ID4 in detail. Printed on the Fax machine is a message 122 which says that if the Fax is not in the state specified by the ID4, the police should be called and that a reward is offered for information leading to the conviction of anyone connected with the theft of the Fax and further that the Fax is secretly marked to verify ownership.

Above and to the left of this message are three lines saying:

(Line 1) "BELONGS TO" 123
(Line 2) "BELONGS AT" 124 and
(Line 3) "USE ALLOWED UNTIL" 125.

Next to these, and above the first message, is an LCD 126 covered with clear plastic. The LCD, with thirty fields 127, ten for each line, provides the information specified by the printed words. On each line, directly below the fields, printed on the clear plastic, are additional words 128 which further specify the information the fields are providing. "Initials" is printed below the first three fields of Line 1. "Telephone no." is printed below the next seven fields. "State" is printed below the first two fields of Line 2. "Street, first 4 nos. and letters" is printed below the next eight fields. "Date" is printed below the first six fields of Line 3.

And "Military Time" is printed below the next four fields. With the information specified by these fields, an observer can easily see if the Fax machine is in its intended state and further, can contact the owner should it not be.

Next to the LCD are ten digit keys 129, one "N. PIN" key 130, one "SET" key 131, one "LETTER" key 132 and one "N. INFO" key 133. The information on the LCD can be changed using these keys *but only after the proper PIN has been entered*. The PIN can be changed but, again, only after it has first been entered correctly.

Figure 31A:
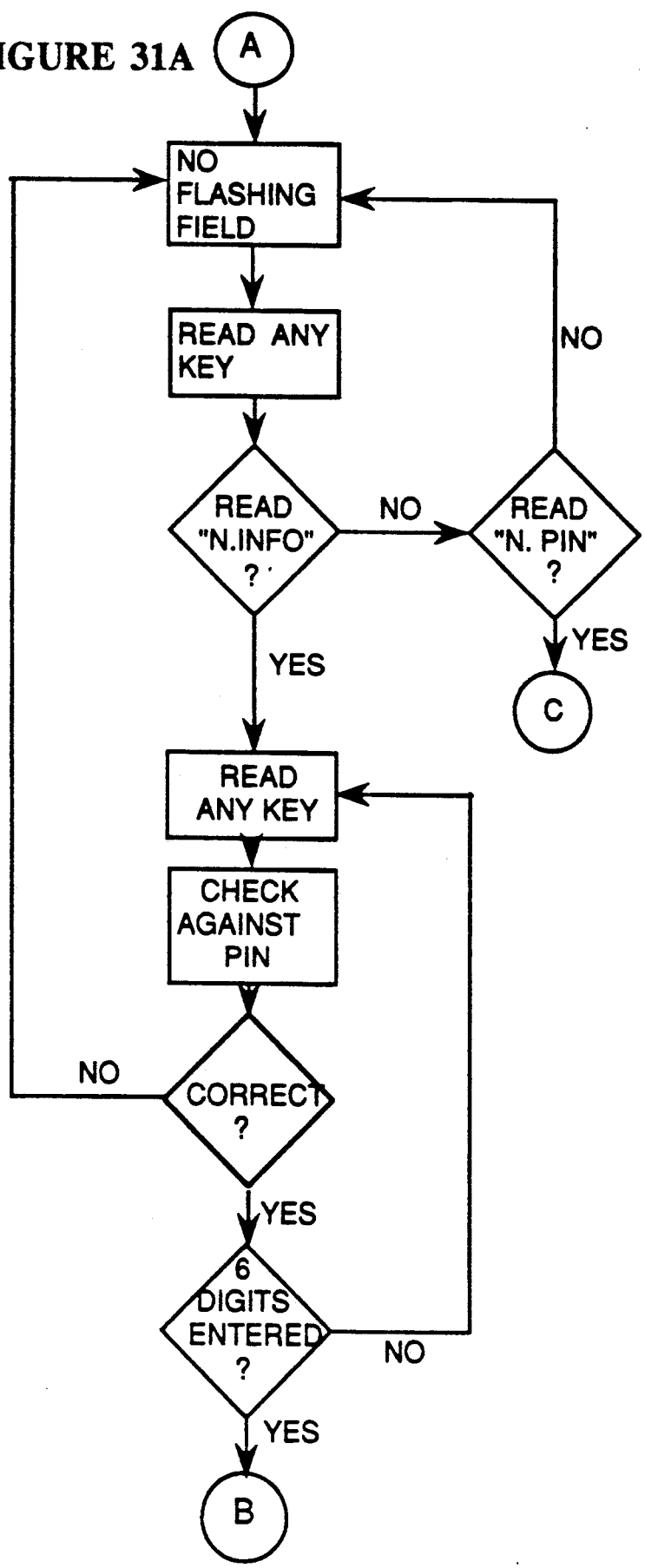
FIGS. 31a-c show the flow chart for the microprocessor directly above.
Figure 31B:
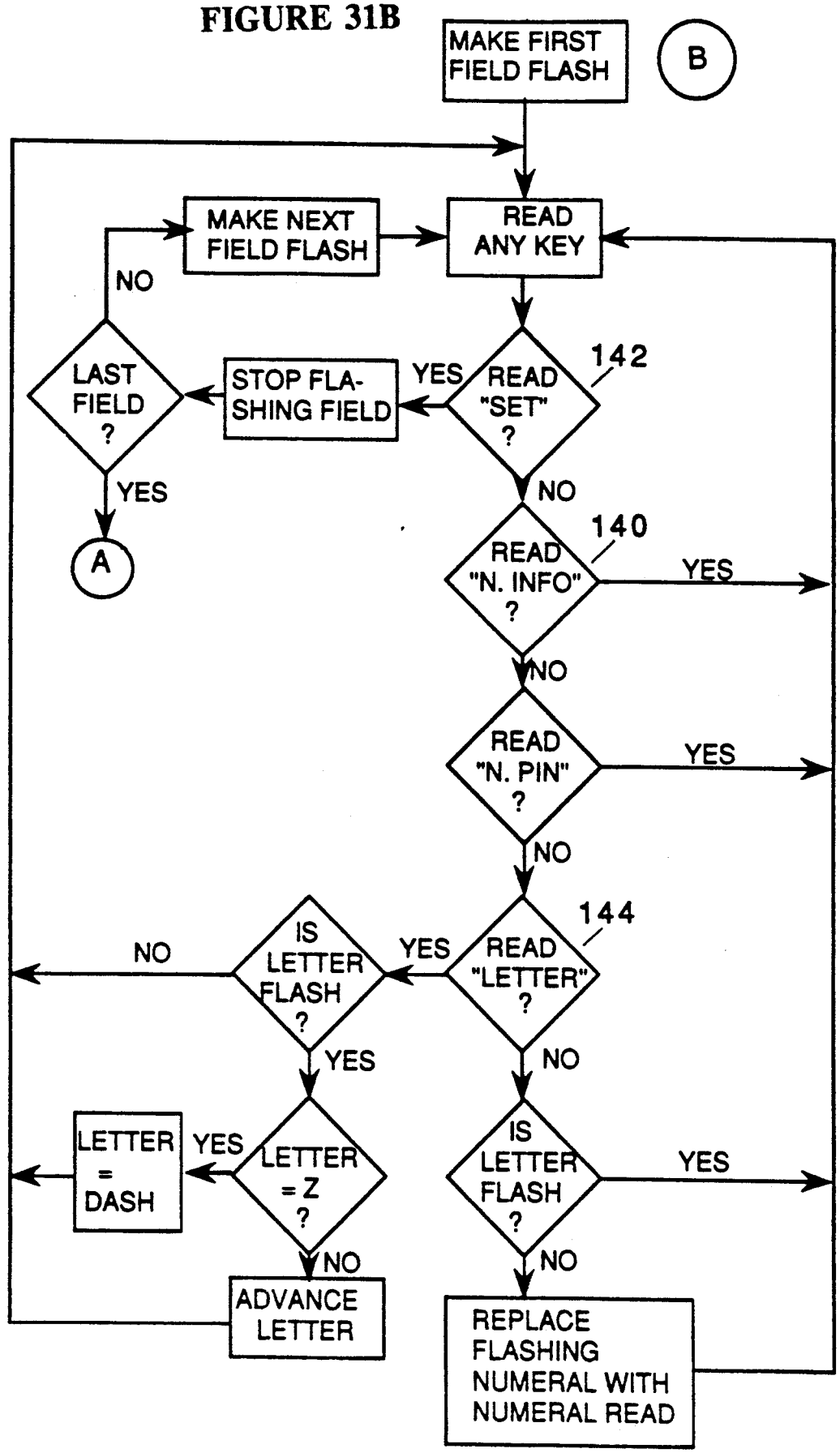
Figure 31C:
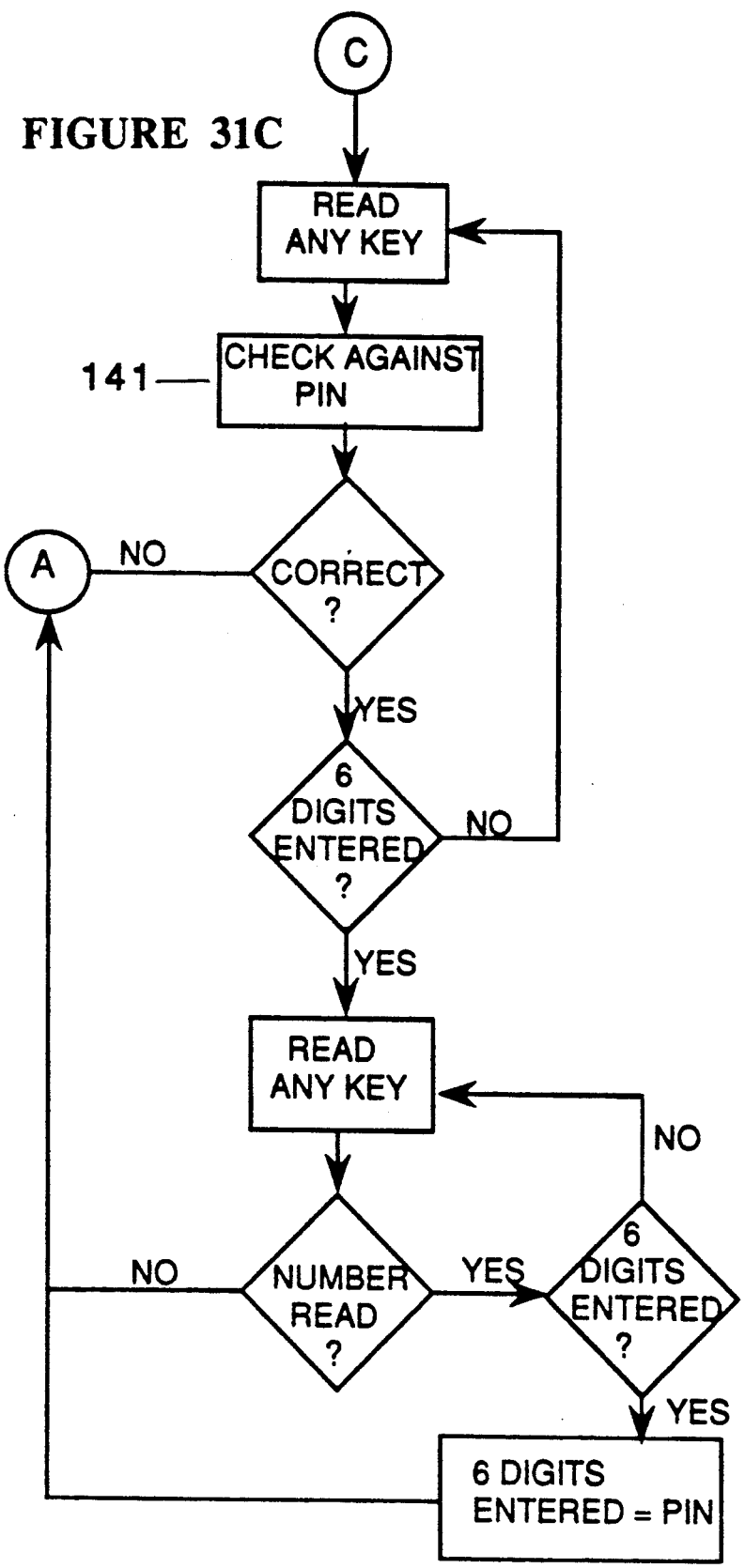

A microprocessor controls these functions as is shown in the flowcharts in FIGS. 31a–c. When the display is set, no key alone will change it. "N. INFO" 140 must be pressed followed by the proper six digit PIN 141. If any key pressed does not match the PIN, the display will stay set. If all six digits are entered correctly, the first field, a letter field, will flash (a letter field can also display a dash). Pressing "SET" 142 freezes whichever field is flashing and starts the next field flashing (unless the just frozen field is the last field, in which case the display is set). If the flashing field is a letter, pressing "LETTER" 144 advances the letter so that, for example, if the letter flashing is "B", "C" will start flashing in its place (if the flashing letter is Z, "-" would be the next letter). If the flashing field is a digit, pressing any digit key will replace the flashing digit with the digit pressed. If the flashing field is a digit, only pressing a digit or "SET" will have any effect. Likewise, if the flashing field is a letter, only pressing "LETTER" or "SET" will have any effect. A new PIN can be entered only when the display is set. "N. PIN" 146 must be pressed followed by the correct six digit PIN then followed by six more digits, which become the new PIN.

The Fax machine provides the power to run this ID4 and contains the microprocessor (with non-volatile memory), switches for the key, and the circuitry needed to connect them all including the LCD.

The ID4 is displayed prominently thereby making it impractical for a thief to take the Fax machine or for others to use it without authority. Moreover, since it is built into the Fax machine, removal is impractical without causing significant damage that would be noticed.

The various components making up the electronic ID4's described, such as LCD's, batteries, connecting circuitry and housings need not be discussed in detail for their manufacture is well known in the art.

I claim:

1. A labelling system for deterring the theft of items comprising, in combination:
   a first part and a second part;

said first part displaying a message describing the state the owner of an item intends the item to be in and stating that the item is stolen if not in that intended state, the message also asking observers to take appropriate action if the item is not in the described state;

said message on said first part being permanently part of said item and tamperproof;

said first part reveals what the second part should look like, what the intended state of the item is when the second part is missing, and what to do if the item is not in its intended state;

said second part, when combined with the first part changes the meaning of the message on the first part to describe a different intended state of the item; and, means for making said message on said first and second parts easily visible by people nearby.

2. The system of claim 1, wherein the second part is applied permanently to the item.

3. The system of claim 1, wherein the second part can be removed and replaced with ease.

4. The system of claim 1, wherein there are multiple second parts, each of which changes said message to describe a different intended state for said item, and each of which can be removed and replaced with ease.

5. The combination of claim 1 wherein the second part is a changeable electronic display means, said electronic display means being responsive to a unique input signal verified against a stored electronic code.

6. The combination of claim 1 wherein the first part contains a symbol and the second part contains the identical symbol.

7. The combination of claim 1, further comprising means, in the form of a mechanical lock, for enabling only designated people to change said second part's description of the intended state of said item, said mechanical lock being made part of said item so that non-designated people cannot remove it from said item, said lock in its locked state displaying said tamperproof message and when unlocked changing said message to another message describing another intended state for said item.

8. The combination of claim 1, further comprising means, in the form of a mechanical lock, for enabling only designated people to change said second part's description of the intended state of said item, said mechanical lock being made part of said item so that non-designated people cannot remove it from said item, said lock having more than two lockable positions, said second part displaying said tamperproof message in one lockable position and in other lockable positions displaying other messages describing other intended states for said item.

9. An anti-theft labelling system for an item comprising an electronic display message describing the state that the owner of the item intends said item to be in and saying that said item is stolen if not in that intended state, said message further asking observers to take appropriate action if said item is not in that intended state;

said message being part of said item and tamperproof; and, means for enabling only designated people to change the meaning of said message to describe a different intended state for said item, said means comprising:

an input means, a memory means and an electronic control means;

said electronic control means changing said message only after verifying an input from said input means against a code stored in said memory; and, means for making said message easily visible to people nearby.

10. The combination of claim 9, including means for making the message visible at all times.

11. The combination of claim 9 wherein said electronic display message is separate from any electronic display used in the operation of said item.

12. The combination of claims 1 or 9, wherein said message also says that said item is secretly marked to verify ownership.

13. The combination of claim 12, wherein said item is secretly marked to verify ownership.

14. The combination of claims 1 or 9, wherein a separate, easily detectable, permanent, tamperproof message is made part of said item, said separate message saying that said item is supposed to have the system of claim 1 or 9 showing and that if said system is not showing, then said item is stolen and appropriate action should be taken.

* * * * *